US011028995B2

(12) United States Patent
Serrano et al.

(10) Patent No.: US 11,028,995 B2
(45) Date of Patent: Jun. 8, 2021

(54) GLAZING WITH DETACHABLE LIGHT DEVICE

(71) Applicants: PILKINGTON BRASIL LTDA, São Paulo (BR); PILKINGTON GROUP LIMITED, Nr. Ormskirk (GB)

(72) Inventors: Tiago Serrano, São Paulo (BR); Andrew Thomas Stanley, Ormskirk (GB)

(73) Assignees: PILKINGTON BRASIL LTDA., Cacapava (BR); PILKINGTON GROUP LIMITED, Lancashire (GB)

( * ) Notice: Subject to any disclaimer, the term of this patent is extended or adjusted under 35 U.S.C. 154(b) by 458 days.

(21) Appl. No.: 15/741,024

(22) PCT Filed: Jul. 1, 2016

(86) PCT No.: PCT/GB2016/052013
§ 371 (c)(1),
(2) Date: Dec. 29, 2017

(87) PCT Pub. No.: WO2017/006097
PCT Pub. Date: Jan. 12, 2017

(65) Prior Publication Data
US 2018/0187858 A1    Jul. 5, 2018

(30) Foreign Application Priority Data

Jul. 3, 2015  (BR) ................. BR020150161719

(51) Int. Cl.
*F21S 43/20* (2018.01)
*B60Q 1/00* (2006.01)
(Continued)

(52) U.S. Cl.
CPC ........ *F21S 43/26* (2018.01); *B32B 17/10174* (2013.01); *B60Q 1/0088* (2013.01);
(Continued)

(58) Field of Classification Search
CPC ........ B60Q 1/268; B60Q 1/302; B60Q 3/208; F21S 45/60; F21S 43/195; F21V 33/0016;
(Continued)

(56) References Cited

U.S. PATENT DOCUMENTS 4,488,141 A * 12/1984 Ohlenforst ............. B60Q 1/268
362/541
4,854,636 A *  8/1989 Greenhalgh ............ B60S 1/52
296/201
(Continued)

FOREIGN PATENT DOCUMENTS

DE    20 2009 018 915 U1    9/2014
EP         1 534 513 B1     4/2011
(Continued)

OTHER PUBLICATIONS

Machine Translation of JPH0569777A from Espacenet (Year: 2020).*
(Continued)

*Primary Examiner* — Alexander K Garlen
*Assistant Examiner* — Colin J Cattanach
(74) *Attorney, Agent, or Firm* — Buchanan Ingersoll & Rooney PC

(57) ABSTRACT

The invention relates to a glazing having a first anchoring support being configured to engage with an electrical connector that is part of an electrically actuated device comprising at least one electrically actuated component and first and second electrical connectors that are connectable with an electrical power supply. Upon electrically connecting the first and second electrical connectors to the power supply, the electrically actuated component has electrical power supplied thereto and is in an energized state. When the first electrical connector is engaged with the first anchoring support, the electrical device is releasably fixed to the glazing. Connecting the power supply to the first anchoring
(Continued)

support and the second electrical connector causes the electrically actuated component to switch from an unenergized state to the energized state. Mounting arrangements and vehicle lights to be mounted to a component of the structure of a vehicle are also described.

20 Claims, 17 Drawing Sheets

(51) Int. Cl.
*B60Q 1/26* (2006.01)
*B60Q 1/30* (2006.01)
*B60Q 3/208* (2017.01)
*B32B 17/10* (2006.01)
*F21S 45/60* (2018.01)
*F21S 43/14* (2018.01)
*F21S 43/19* (2018.01)
*B60Q 1/22* (2006.01)
*B60Q 1/44* (2006.01)
*F21V 23/06* (2006.01)
*F21V 19/00* (2006.01)
*F21Y 115/10* (2016.01)

(52) U.S. Cl.
CPC .............. *B60Q 1/22* (2013.01); *B60Q 1/268* (2013.01); *B60Q 1/2696* (2013.01); *B60Q 1/302* (2013.01); *B60Q 1/44* (2013.01); *B60Q 3/208* (2017.02); *F21S 43/14* (2018.01); *F21S 43/195* (2018.01); *F21S 45/60* (2018.01); *F21V 23/06* (2013.01); *F21S 43/19* (2018.01); *F21V 19/003* (2013.01); *F21V 19/004* (2013.01); *F21V 19/0035* (2013.01); *F21V 19/0045* (2013.01); *F21Y 2115/10* (2016.08)

(58) Field of Classification Search
CPC .. F21V 19/003; F21V 19/0035; F21V 19/004; F21V 19/0045
See application file for complete search history.

(56) References Cited

U.S. PATENT DOCUMENTS

| | | | | |
|---|---|---|---|---|
| 5,241,457 A * | 8/1993 | Sasajima | .............. | B60Q 1/2696 362/503 |
| 5,272,602 A * | 12/1993 | Sasajima | .............. | B60Q 1/2696 362/396 |
| 5,289,353 A * | 2/1994 | Sasajima | ................ | B60Q 1/302 362/368 |
| 5,641,558 A * | 6/1997 | Noda | ................ | B32B 17/10018 428/195.1 |
| 2005/0238857 A1 | 10/2005 | Day | | |
| 2007/0210621 A1 | 9/2007 | Barton et al. | | |
| 2007/0258270 A1 | 11/2007 | Scheiman | | |
| 2011/0057465 A1* | 3/2011 | Beau | ...................... | B60K 37/00 296/1.08 |
| 2011/0267833 A1 | 11/2011 | Verrat-Debailleul et al. | | |
| 2012/0320621 A1* | 12/2012 | Kleo | ................ | B32B 17/10018 362/558 |
| 2013/0019532 A1* | 1/2013 | Ash, Jr. | .................... | H05B 3/84 49/70 |
| 2013/0033894 A1* | 2/2013 | Kleo | ...................... | B60Q 1/268 362/602 |
| 2014/0003076 A1* | 1/2014 | Suganumata | ............ | B60Q 1/30 362/511 |
| 2014/0204601 A1* | 7/2014 | Bauerle | .................. | B60Q 1/268 362/511 |
| 2014/0369059 A1 | 12/2014 | Barton et al. | | |
| 2015/0016132 A1* | 1/2015 | Verrat-Debailleul | ... | F21S 43/20 362/509 |
| 2015/0109805 A1 | 4/2015 | Verrat-Debailleul et al. | | |
| 2016/0161081 A1 | 6/2016 | Verrat-Debailleul | | |
| 2016/0200241 A1* | 7/2016 | Snider | .................... | B60Q 1/268 296/146.16 |

FOREIGN PATENT DOCUMENTS

| | | | | |
|---|---|---|---|---|
| JP | | 2584371 B2 * | 2/1997 | ............. B60Q 1/302 |
| WO | WO 2005/097551 A1 | | 10/2005 | |

OTHER PUBLICATIONS

International Search Report (PCT/ISA/210) dated Oct. 5, 2016, by the European Patent Office as the International Searching Authority for International Application No. PCT/GB2016/052013.

Written Opinion (PCT/ISA/237) dated Oct. 5, 2016, by the European Patent Office as the International Searching Authority for International Application No. PCT/GB2016/052013.

* cited by examiner

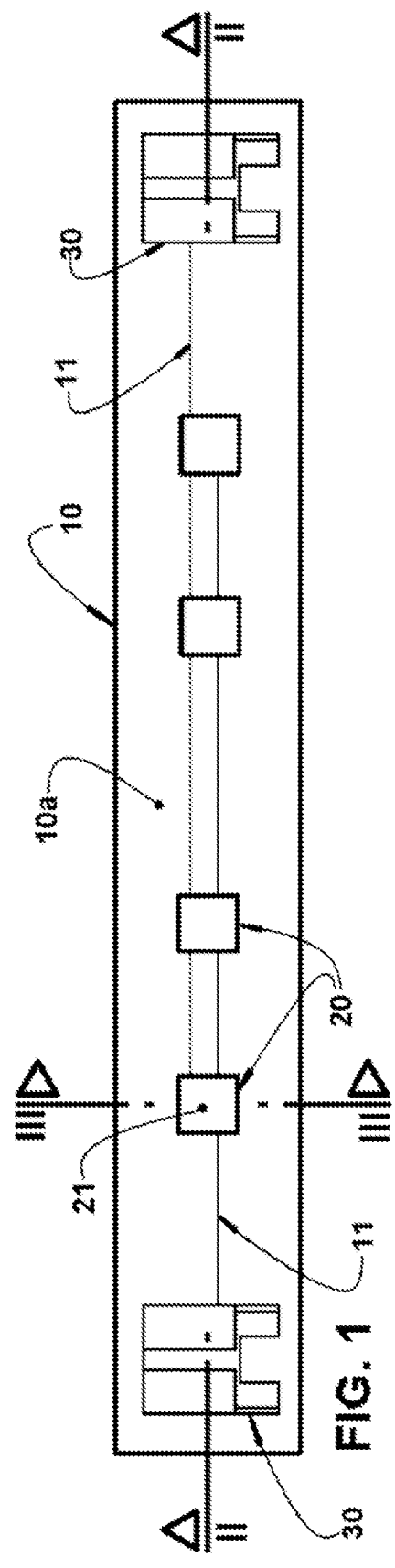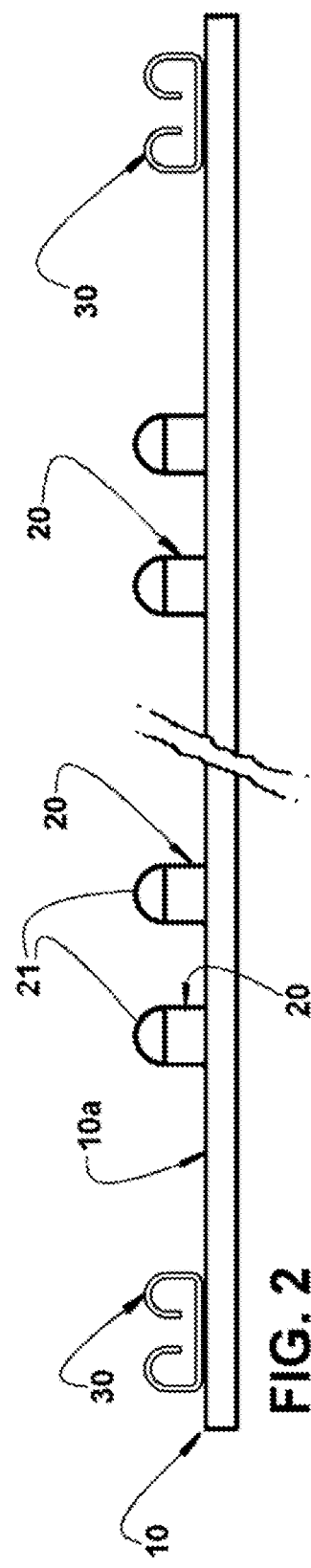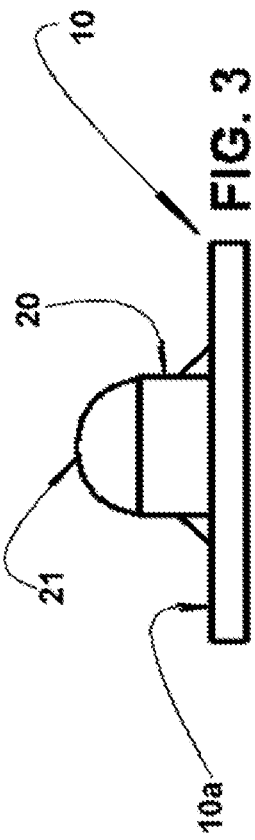

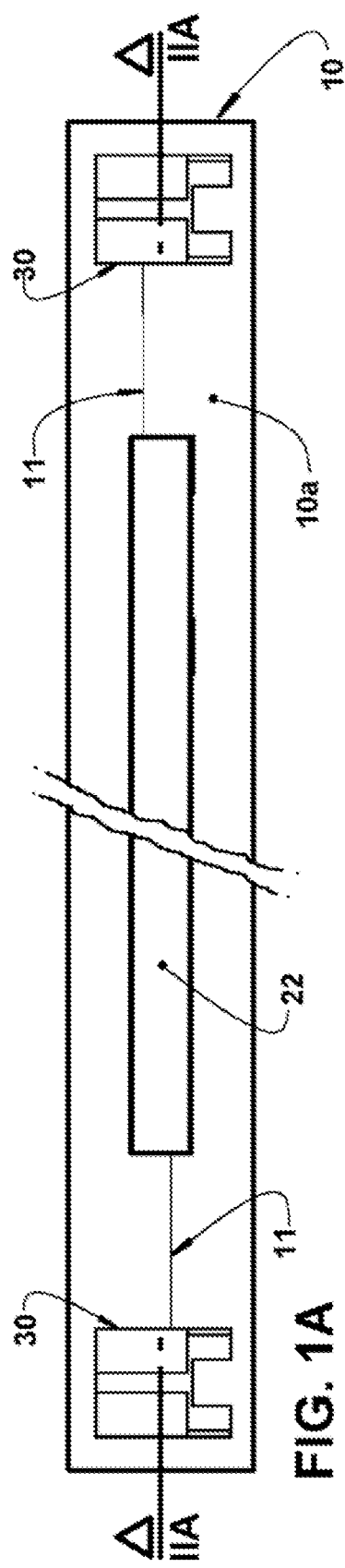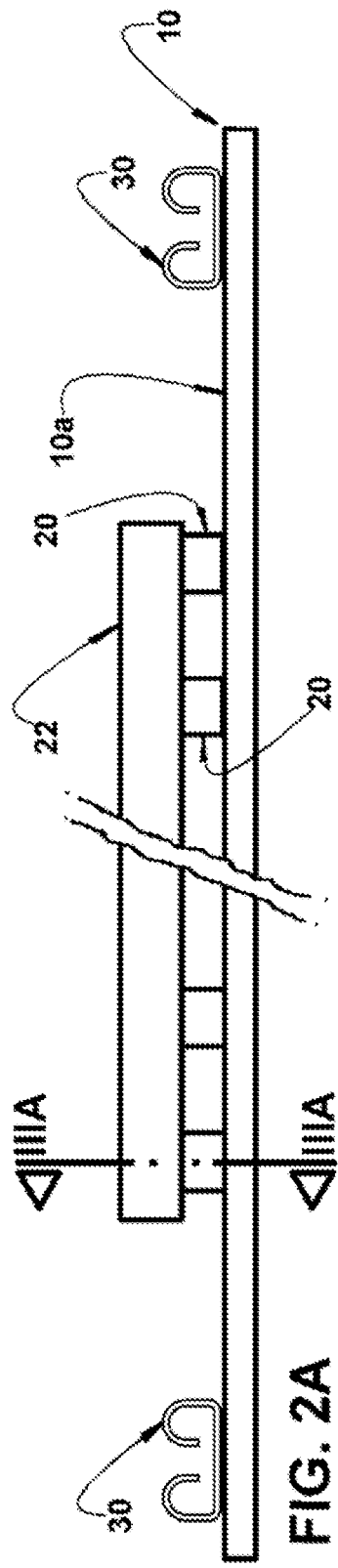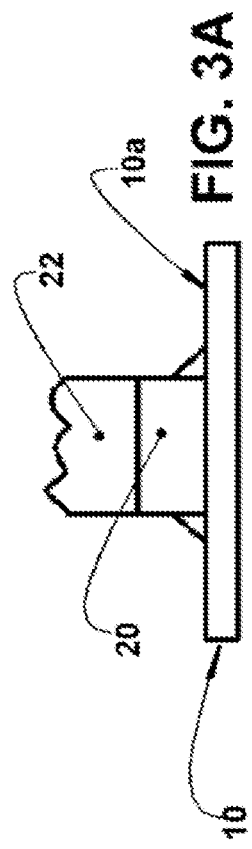

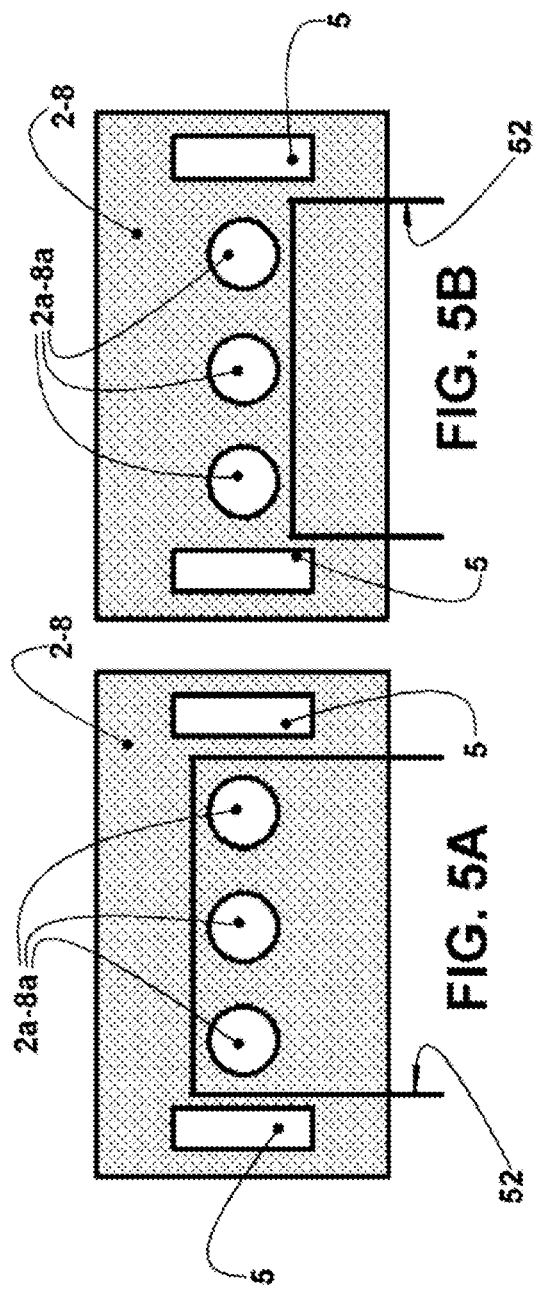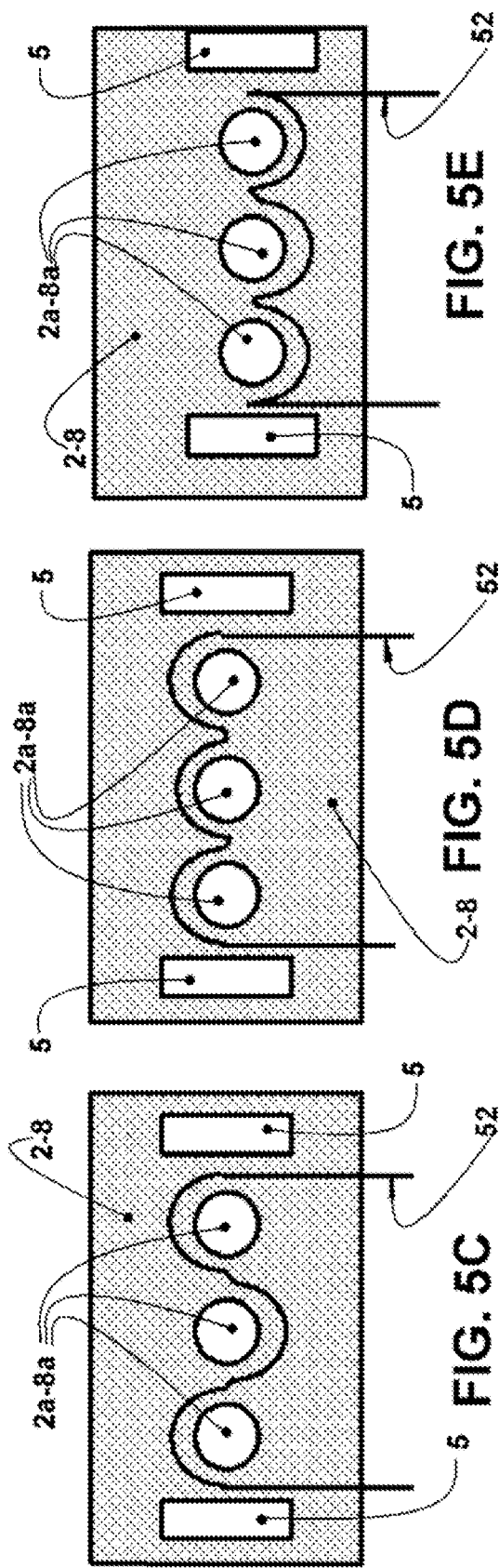

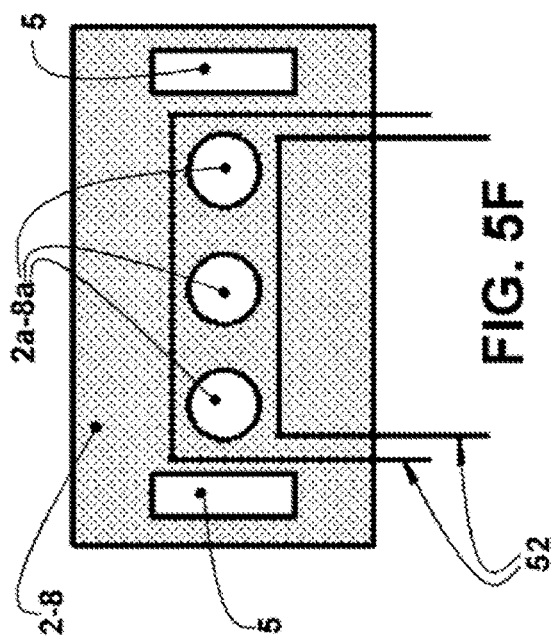
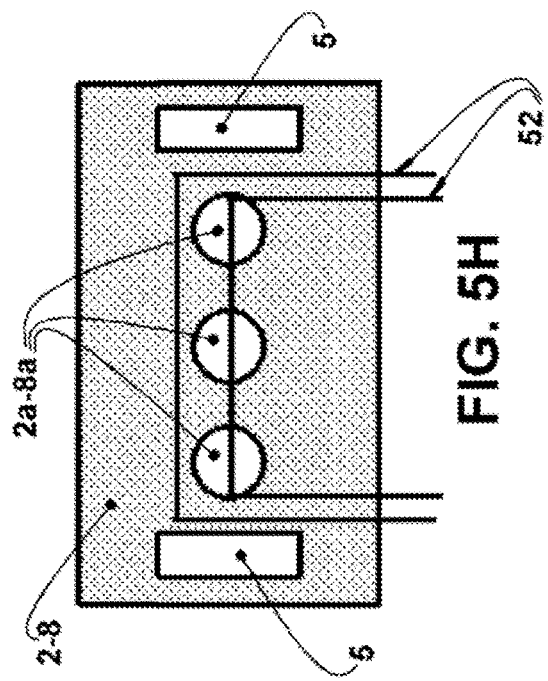
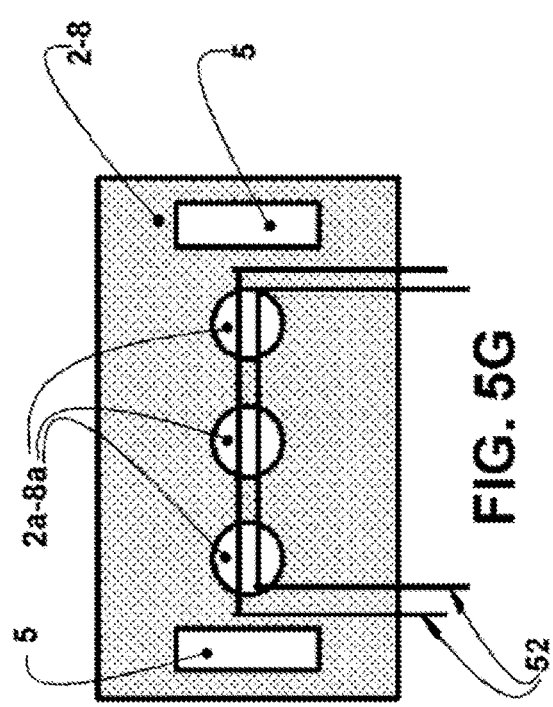

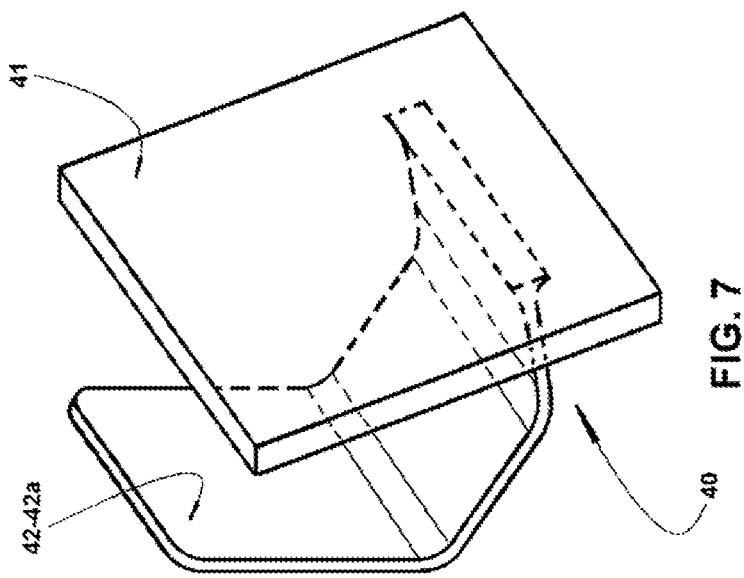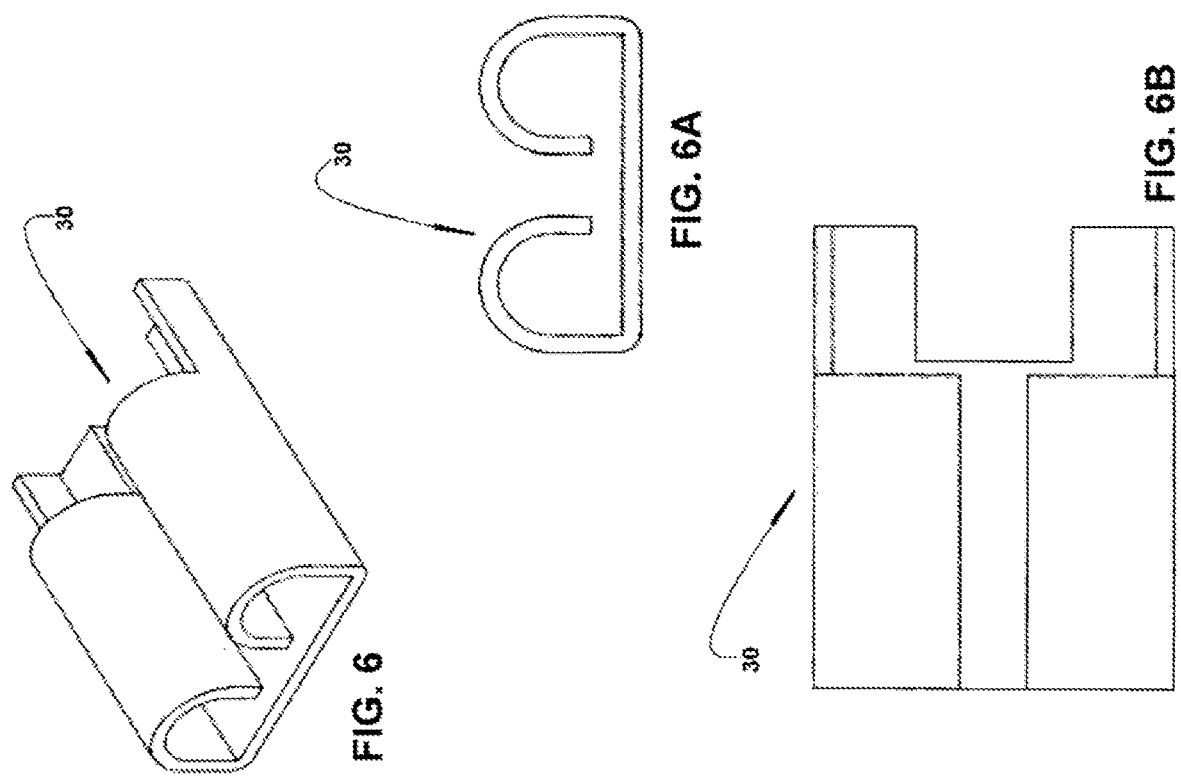

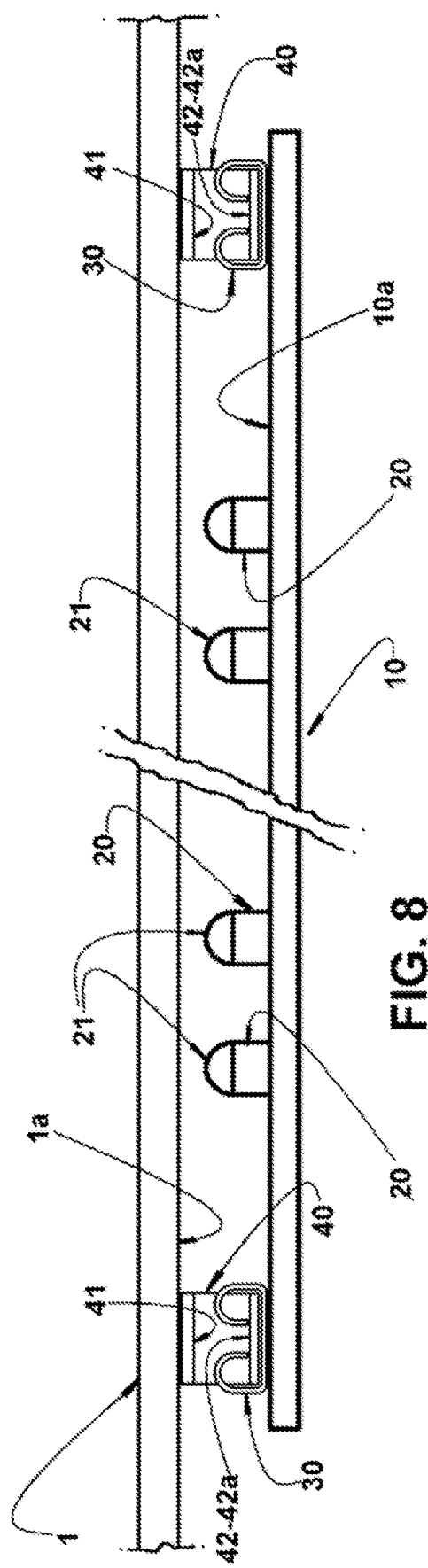

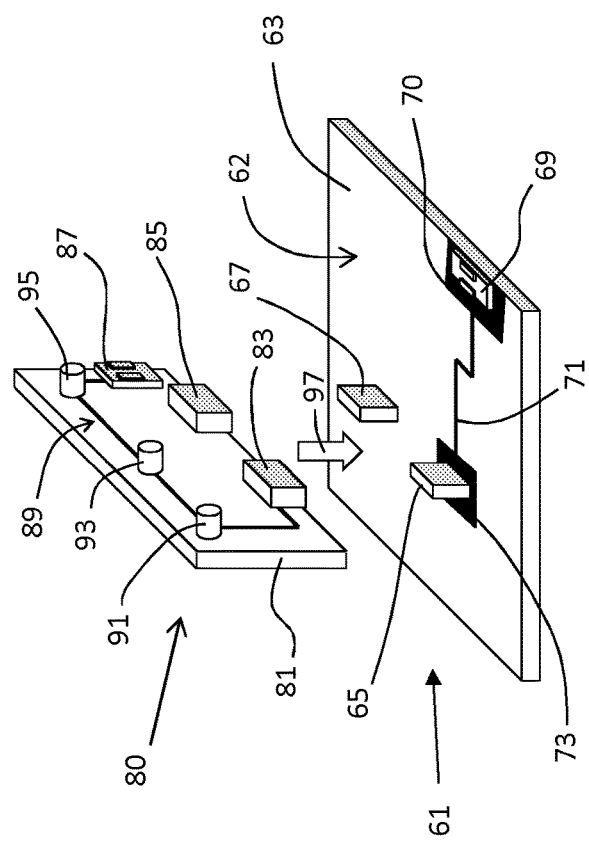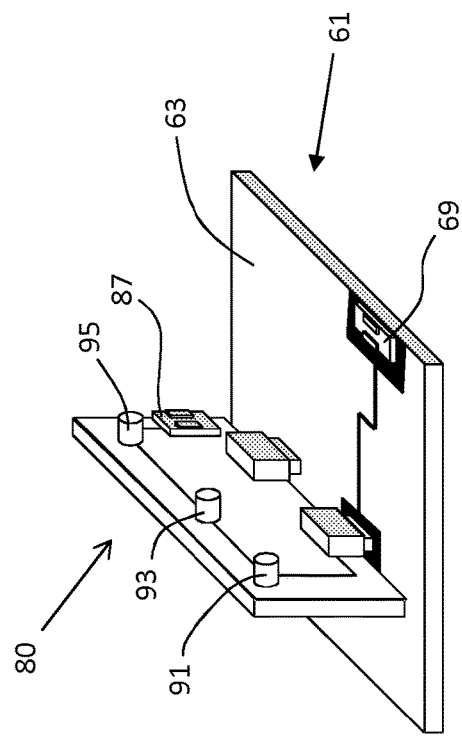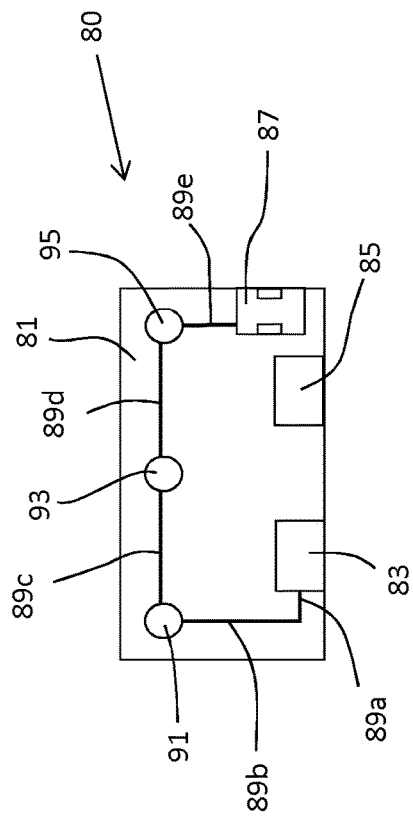

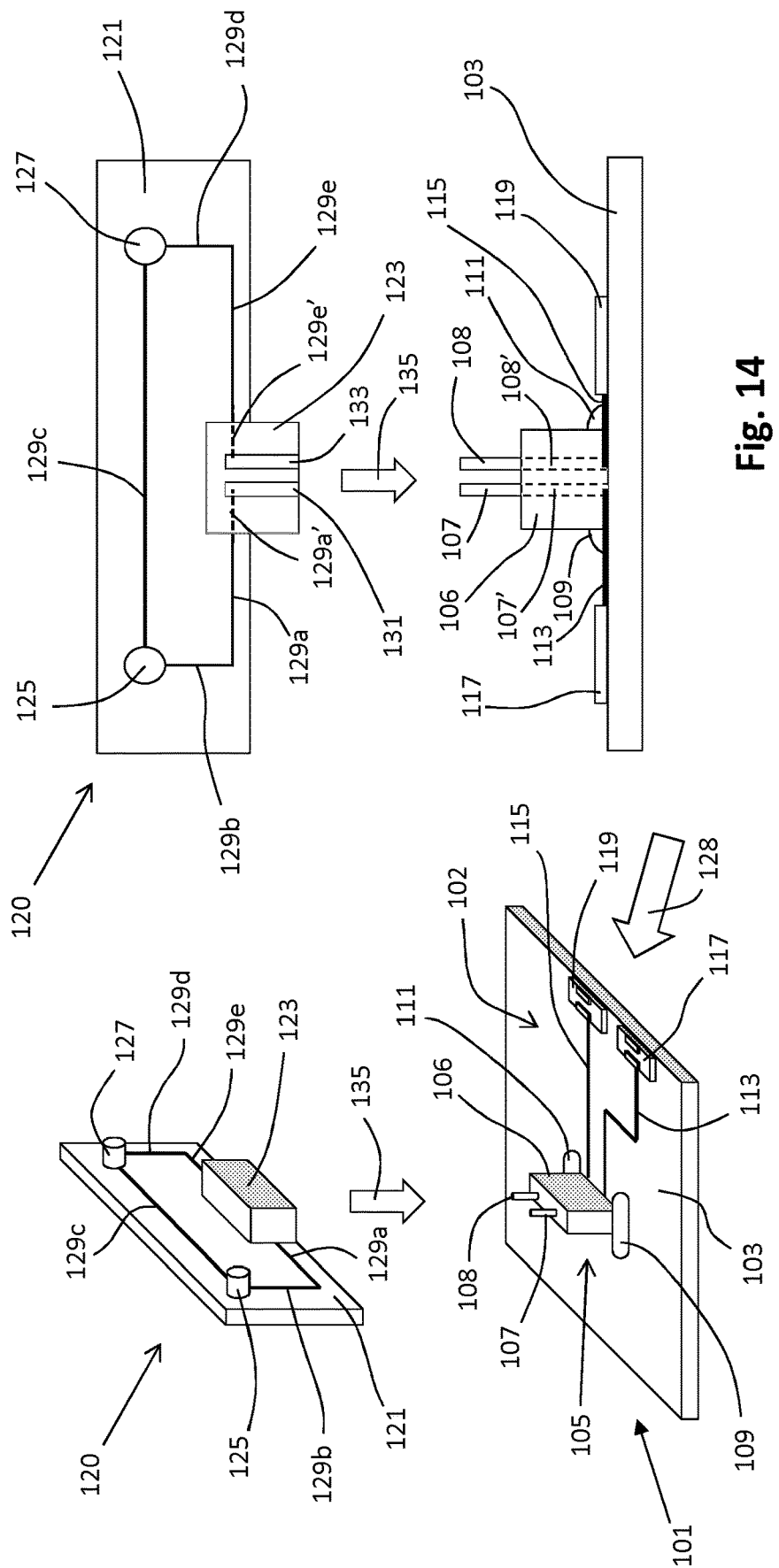

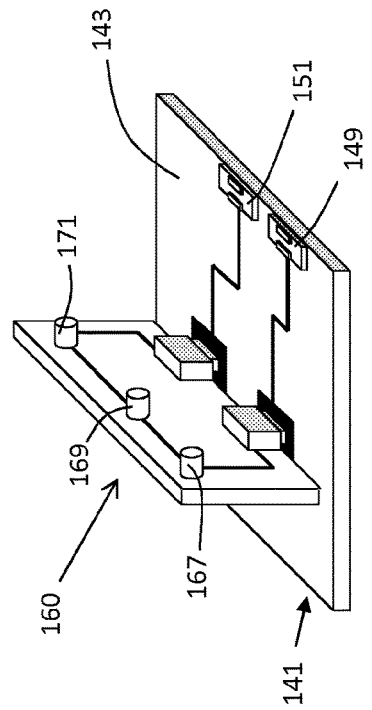
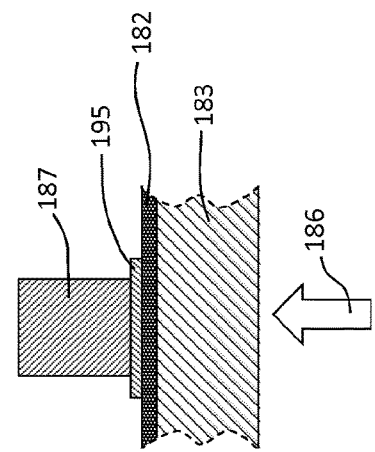
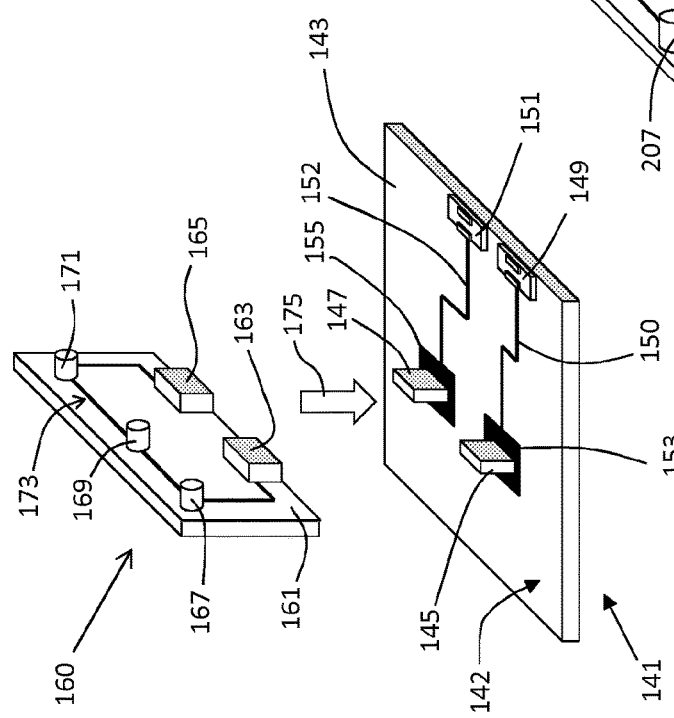
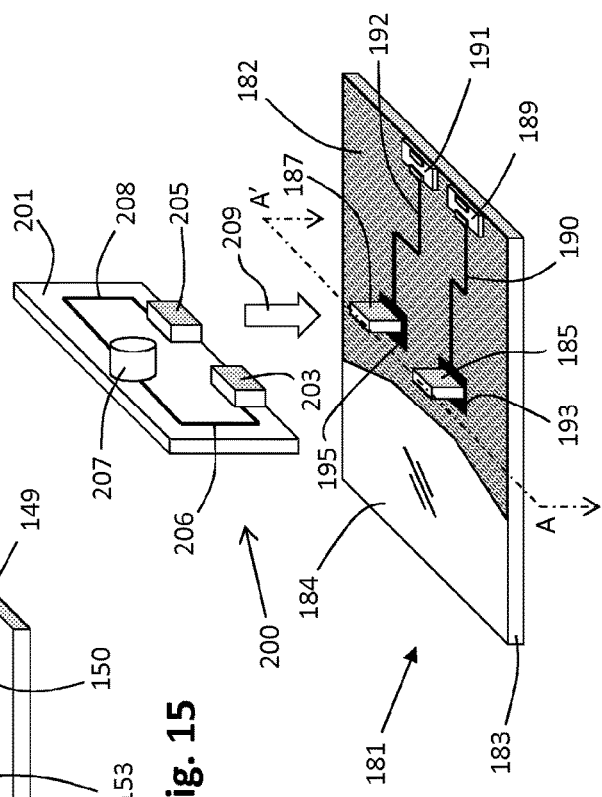

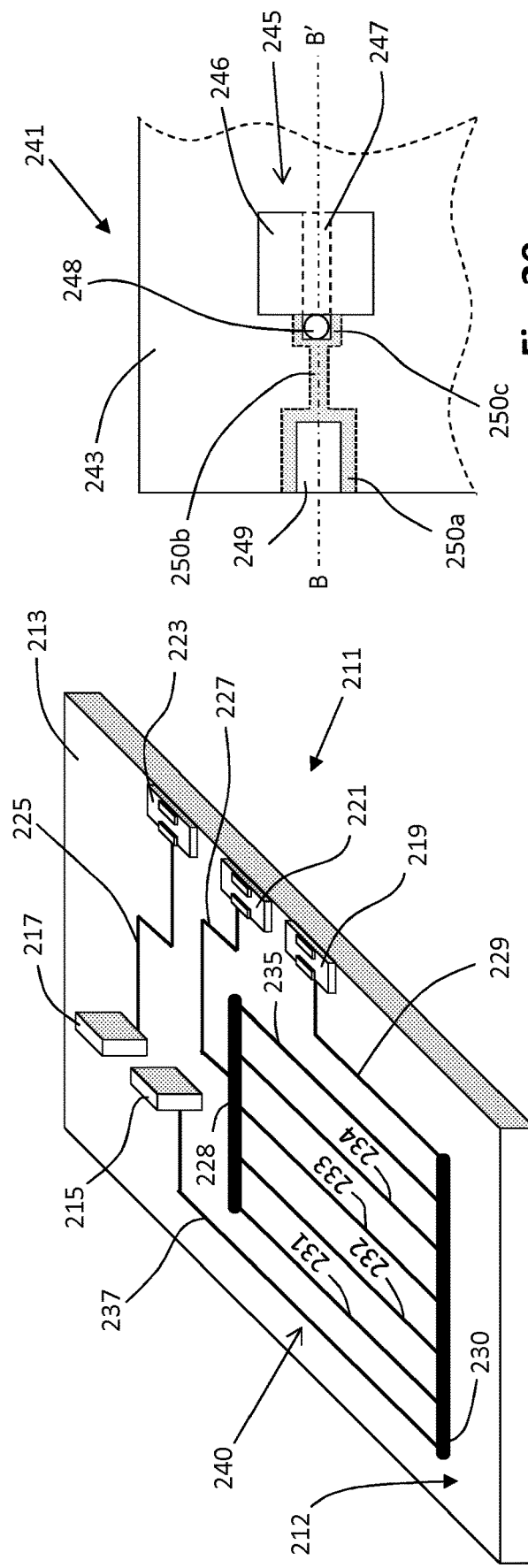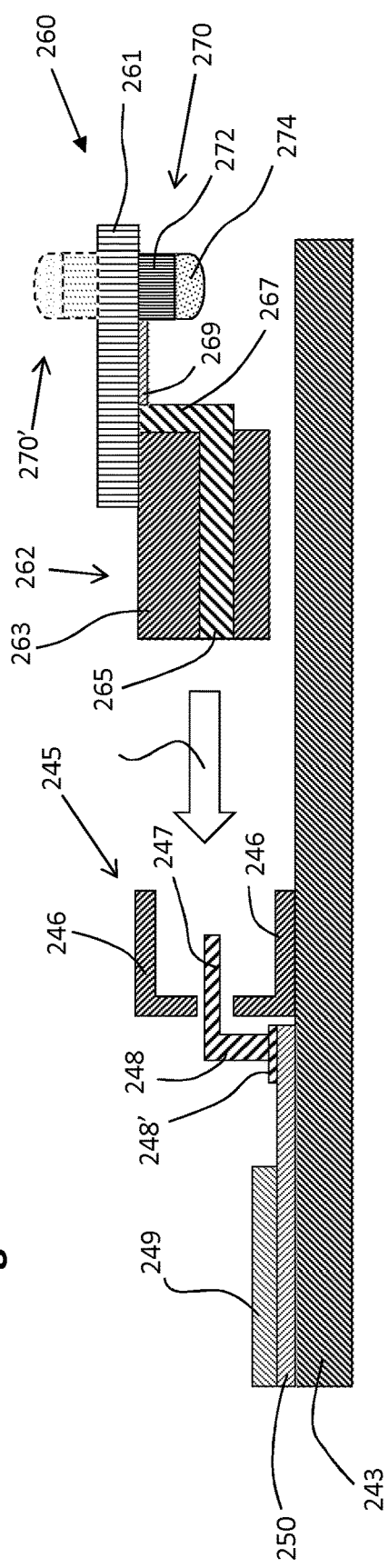

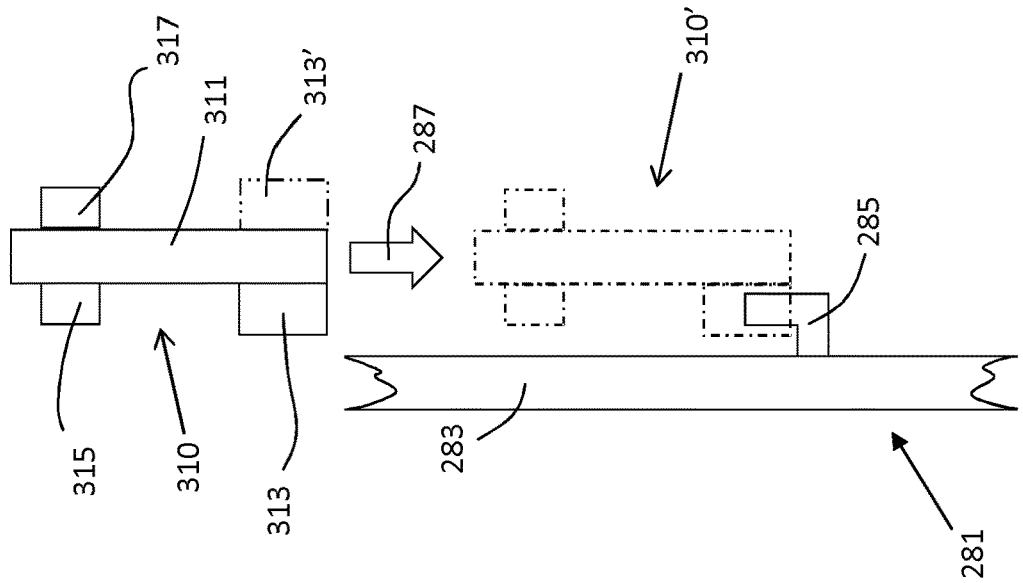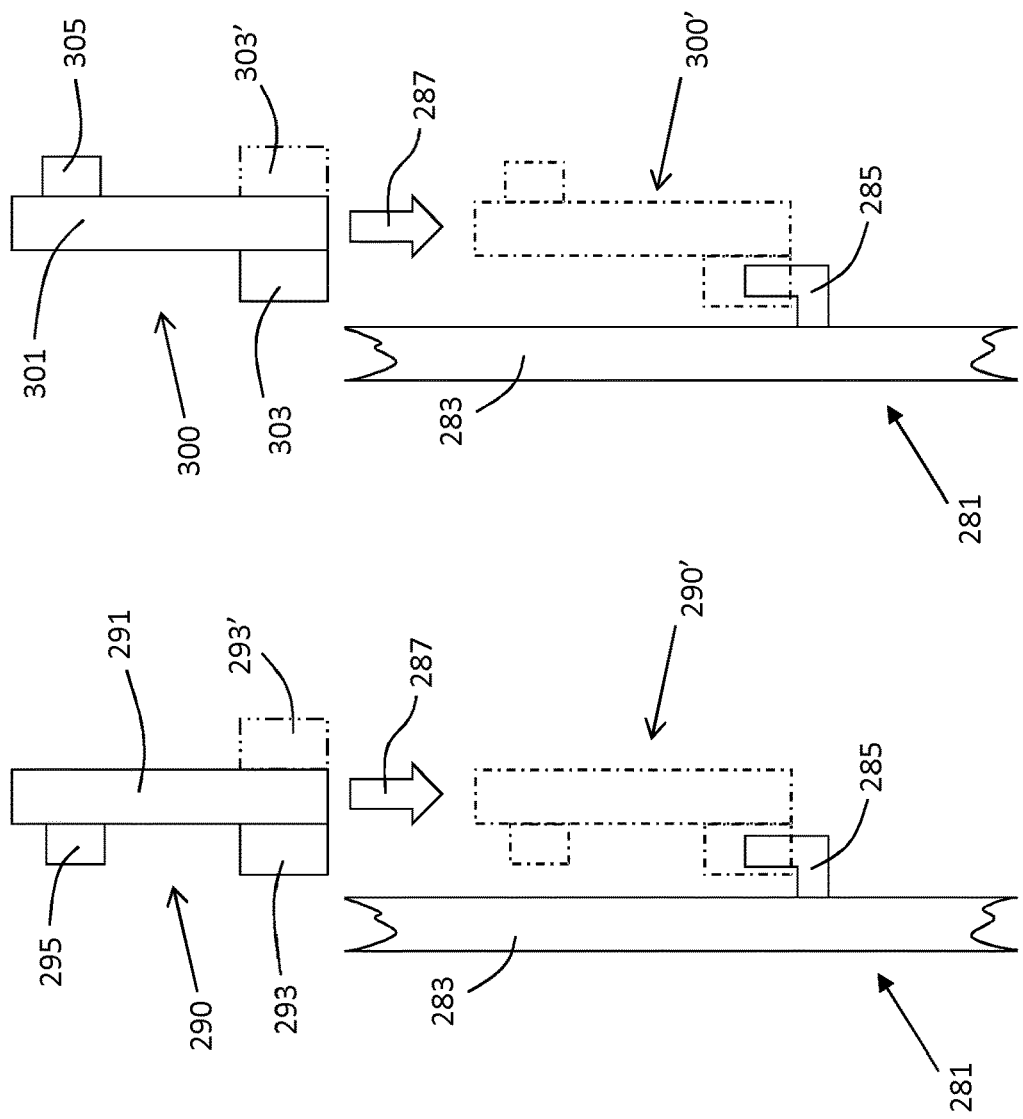

GLAZING WITH DETACHABLE LIGHT DEVICE

The present invention relates to a glazing having means for releasably fixing an electrically actuated device thereto.

The present invention also refers, in general, to the provision of a brake light to be mounted to the glass of the rear window of a motor vehicle, and to an arrangement for mounting said brake light to the glass of the rear window of a motor vehicle.

The provision of an electrically actuated device such as an illumination device to a sheet of glazing material, such as in a window for a building or a vehicle is well known. For example, light emitting diodes mounted on a circuit board laminated between two glass plies of a laminated glazing are described in EP1534513B.

However a problem with such a laminated glazing is that if the illumination device fails, it is difficult to repair or replace.

This problem may be alleviated by positioning the illumination device on an exposed surface of the gazing, for example as described in WO2005/097551A1. However devices that are positioned on an exposed surface using adhesive means may be difficult to remove in the event the device fails.

One particular illumination device for a vehicle glazing is a vehicle brake light.

It is already well known in the art several constructive arrangements for providing an additional brake light located in a rear region of the vehicle, which region is higher than the usual taillights, for better signalling, to the driver of a following vehicle, the application of the brakes in the vehicle travelling in front.

The type of brake light considered herein has its light emitting means (bulbs or LEDs) energized by a pair of electric conducts, usually in the form of harnesses, one being connected to the vehicle metallic body or negative pole of the battery, whereas the other is connected to the positive pole of the battery through a switch operatively associated with the vehicle brake pedal.

In more recent constructions, the brake light is defined by a housing, usually in plastic material, inside which is affixed a support plate, preferably a printed circuit board, in which rear face are affixed light emitting means, usually LEDs arranged according to a certain geometric layout, for example, in a straight line, the light emitting means being powered by a pair of electric conducts as already mentioned above. In these constructions, the housing presents a rear opening which is closed by a lens required to limit the emission angle of the light produced by the light emitting means, and also a front opening closed by a cover in order to define the trim of the housing portion usually facing the interior of the vehicle and, therefore, visible.

In the assemblies in which the brake light has the housing thereof affixed to a portion of the vehicle body itself, such as the case, for example, of affixing the brake light to spoilers and other parts of the vehicle, the housing may be affixed directly to the vehicle body in different ways. In this case, the electric conducts are usually located inside the adjacent vehicle body portions, without requiring complex and costly constructions in order to hide both the electric conducts (wiring) and their connections to the terminals provided in the support plate region, for powering of the light emitting means.

It is also known the assemblies in which the brake light has its housing affixed, usually by gluing, directly to the inner face of the lower central region of the glass of the rear window of the vehicle. In this type of assembly, the brake light is provided in the height of the lower region of the glass of the rear window and the electric conducts (wiring) and the terminals for the connection thereof to one or a plurality of light emitting means may be located inside the adjacent portions of the vehicle body or of its inner trim, without requiring complex and costly constructions in order to hide them.

Although facilitating, to a certain extent, the installation of the electric conducts and terminals in the vehicle structure, the mounting solutions mentioned above present the drawback of requiring the positioning of the brake light next to a vehicle body portion which may house, in a non-visible manner and without major constructive modifications, the electric conducts and terminals or connectors. Thus, these known assemblies are usually carried out in the level of the lower region of the glass of the rear window, that is, in a level defined only slightly above the level in which are usually provided the regular taillights of the vehicle, which contain the conventional brake lights.

In another known type of mounting arrangement, the brake light, also comprising a box lodging the support plate and the one or more light emitting means mounted in the latter, is directly glued to the upper central region of the inner face of the glass of the rear window. Despite positioning the brake light at a much higher level and in a more visible way than the usual taillights, this construction also defines an assembly formed by the box, by the lens closing the rear opening of the box, by a front cover and by a support plate carrying the light emitting means, making difficult the replacement of component parts in the event any of these parts comes to fail. Additionally, due to the fact of being positioned in the upper central region of the glass of the rear window, this brake light requires the provision of an independent pair of electric conducts for powering the light emitting means, said conducts which, in order to be kept hidden, must be installed within the inner trim of the vehicle roof, in the edge regions of the glass of the rear window and adjacent to the mounting position of the brake light.

Independently of the assembly of the electric conducts being more or less complex upon placing the brake light at the upper central region of the glass of the rear window, it requires the provision of specific harnesses as additional elements to be produced separately and also assembled, in a non-visible manner, to the vehicle structure, increasing manufacture costs and impairing any maintenance operation to those elements.

Still another drawback of the solutions described above arises from the fact of said solutions requiring, when assembled inside the vehicle, the provision of the housing, of the lens and of the front trim cover, with the housing being glued in a non-removable manner directly to the glass and with the support plate being permanently affixed inside the housing. In this construction, the means for securing the brake light to the glass are defined by gluing the housing to a previously prepared area of the glass, whereas the electric connection means between the conducts (wiring) and the support plate are defined by terminals or connectors provided in both parts and which do not present the function of mechanically retaining the assembly to the vehicle. This construction is relatively complex, requiring several elements and making difficult the dismantling of the brake light for any repair or replacement, the high quantity of component parts being a factor for increasing the cost of the final product.

In these types of construction, the assembly of the housing of the brake light to the vehicle is carried out only upon construction of the vehicle, since its previous assembly by the glass manufacturer would lead to parts presenting large thickness, making economically unfeasible the mass transportation of such glasses from the manufacturer to the carmaker.

In relation to vehicles, other types of illumination device include any signalling lights, for example indicator lights used to indicate the vehicle intends to turn left or right, a reverse gear light used to indicate the reverse gear of the vehicle has been engaged, fog lights etc. These "signal lights" share the common feature that when they are installed in a vehicle, in use they are configured to direct light away from the interior cabin space of the vehicle, and are visible to other vehicle users.

Another type of illumination device in vehicles is used to illuminate at least a portion of the cabin space of the interior of the vehicle. In contrast to signal lights, interior lights are configured such that in use, light is directed into the cabin space to illuminate a portion thereof.

In the field of buildings, illumination devices may be used with windows, interior partitions or doors.

Illumination devices are also used in other areas that use sheets of glazing material, including furniture, cabinets, fridges and ovens.

The present invention aims to provide a glazing that at least partially overcomes the drawbacks mentioned above.

Due to the drawbacks mentioned above and associated with the prior art solutions, it is also one of the objectives of the present invention to provide a brake light, to be affixed to the upper or lower region of the glass of the rear window, or of any other structural element of a motor vehicle and presenting a simple construction of reduced thickness in relation to the known devices, utilizing a reduced number of components which are easy to be mounted and dismounted in relation to the structural element, for example, the glass of the rear window of the vehicle.

It is a further objective of the present invention to provide a brake light, as mentioned above, which may be mounted to the structural element, for example the glass of the rear window of the vehicle, without relevantly interfering in the volume occupied by the structural element-brake light assembly, particularly the glass-brake light assembly, upon transportation thereof to the carmaker.

It is still another objective of the invention to provide an arrangement for mounting the brake light, such as mentioned above, to the glass of the rear window of a motor vehicle, by using the same means for the removable mechanical retention of the brake light to the glass and for the electrical connection of the brake light to the energizing electric conducts, without requiring the hidden assembly of said electric conducts in the transparent regions of the glass.

Accordingly from a first aspect the present invention provides a glazing comprising a sheet of glazing material having a first major surface and a second opposing major surface, there being a first anchoring support mounted on the sheet of glazing material, the first anchoring support being configured to engage with an electrical connector that is part of an electrically actuated device, the electrically actuated device comprising a first electrical connector, a second electrical connector and at least one (a first) electrically actuated component in electrical communication with the first electrical connector and the second electrical connector, the first and second electrical connectors of the electrically actuated device being connectable with an electrical power supply having first and second terminals such that upon electrically connecting the first electrical connector of the electrically actuated device to the first terminal of the power supply and the second electrical connector of the electrically actuated device to the second terminal of the power supply, the electrically actuated device has electrical power supplied thereto and the first electrically actuated component is in an energized state, the first electrically actuated component having an unenergized state when no electrical power is supplied thereto, characterised in that when the first electrical connector of the electrically actuated device is engaged with the first anchoring support, the electrically actuated device is releasably fixed to the sheet of glazing material such that upon bringing the first terminal of the power supply into electrical communication with the first electrical connector of the electrically actuated device via the first anchoring support, and bringing the second terminal of the power supply into electrical communication with the second electrical connector of the electrically actuated device, the first electrically actuated component switches from the unenergized state to the energized state.

When the first electrical connector of the electrically actuated device is engaged with the first anchoring support such that the electrically actuated device is releasably fixed to the sheet of glazing material, the electrically actuated device can be considered to be mechanically retained to the sheet of glazing material. The engagement of the first electrical connector of the electrically actuated device with the first anchoring support mechanically retains the first electrical connector of the electrically actuated device with the first anchoring support in a releasable manner.

It is preferred that bringing the first terminal of the power supply into electrical communication with the first electrical connector of the electrically actuated device via the first anchoring support comprises making a galvanic connection between the first terminal of the power supply and the first anchoring support. There may be electrical switching means between the first anchoring support and the first terminal of the power supply.

As is evident, the first anchoring support is able to conduct electricity through a least a portion thereof.

An electrically actuated component requires electricity to function and includes lighting components such as bulbs and light emitting diodes.

A glazing according to the first aspect of the present invention has the advantage that in the event of the electrically actuating device failing, it is simple to replace. In addition, less connectors are required (electrical and/or mechanical) as the first anchoring support act to both mechanically retain the electrically actuated device to the sheet of glazing material and is used as an electrical connection means to the electrically actuated device.

Preferably the first anchoring support comprises first and second electrical conductors, the first electrical conductor of the first anchoring support configured to be electrically connectable with the first terminal of the power supply and the second electrical conductor of the first anchoring support configured to be electrically connectable with the second terminal of the power supply, the first electrically actuated component being in the energized state when the first terminal of the power supply is in electrical communication with the first electrical conductor of the first anchoring support and the second terminal of the power supply is in electrical communication with the second electrical conductor of the first anchoring support.

Preferably the first anchoring support comprises a plug configured to engage with a socket, the socket being associated with the first electrical connector. When the first anchoring support comprises first and second electrical conductors and a plug, preferably the first and/or second electrical conductors of the first anchoring support are mounted in the plug.

Preferably the first anchoring support comprises a socket configured to engage with a plug, the plug being associated with the first electrical connector. When the first anchoring support comprises first and second electrical conductors and a socket, preferably the first and/or second electrical conductors of the first anchoring support are mounted in the socket.

Preferably the glazing comprises a second anchoring support mounted on the sheet of glazing material, the second anchoring support being configured to engage with the second electrical connector of the electrically actuated device, such that upon engaging the first electrical connector with the first anchoring support, and engaging the second electrical connector with the second anchoring support, the electrically actuated device is releasably fixed to the sheet of glazing material.

In embodiments where the glazing comprises a second anchoring support mounted on the sheet of glazing material, when the first electrical connector is engaged with the first anchoring support, and the second electrical connector is engaged with the second anchoring support, it is preferred that upon bringing the first terminal of the power supply into electrical communication with first electrical connector of the electrically actuated device via the first anchoring support and bringing the second terminal of the power supply into electrical communication with second electrical connector of the electrically actuated device via the second anchoring support, the first electrically actuated component is switched from the unenergized state to the energized state.

It is preferred that bringing the second terminal of the power supply into electrical communication with the second electrical connector of the electrically actuated device via the second anchoring support comprises making a galvanic connection between the first terminal of the power supply and the second anchoring support. There may be electrical switching means between the second anchoring support and the second terminal of the power supply.

In these embodiments it is evident that the second anchoring support is able to conduct electricity through a least a portion thereof.

In some embodiments preferably the first anchoring support is mounted on the sheet of glazing material by a hole that passes through the first and/or second major surface of the sheet of glazing material.

In some embodiments preferably the first anchoring support is mounted on the first major surface of the sheet of glazing material. Preferably the first anchoring support is mounted on the first major surface of the sheet of glazing material by an adhesive, in particular an electrically conductive adhesive, and/or a layer of solder.

When the glazing comprises a second anchoring support, the second anchoring support may be mounted in one of the ways described above for the first anchoring support.

Embodiments of the first aspect of the present invention have other preferable features.

Preferably the electrically actuated component comprises a source of illumination.

Preferably the source of illumination is configured to emit light between the first major surface of the sheet of glazing material and the second major surface of the sheet of glazing material.

Preferably the source of illumination is configured to emit light away from the first major surface of the sheet of glazing material.

Preferably the electrically actuated component comprises at least one (a first) light emitting diode. Preferably the first light emitting diode is in electrical communication with the first and second electrical connectors of the electrically actuated device.

When the electrical device comprises at least one light emitting diode, the energized state is when the first light emitting diode is switched on i.e. producing light and the unenergized state is when the light emitting diode is switched off i.e. is not producing light.

The first light emitting diode may emit light of any colour in the visible region (380 nm to 780 nm) of the electromagnetic spectrum. The light emitting diode may emit in the infra-red region, in particular between 780 nm and around 1000 nm, either with or without light in the visible region.

Preferably the first light emitting diode incorporates a lens having a light emission angle lower than 45°.

Preferably the first major surface of the sheet of glazing material comprises at least one concave portion, the second major surface having a respective convex portion.

Preferably the sheet of glazing material comprises at least one sheet of glass, in particular soda-lime-silica glass, sometimes referred to as a soda-lime-silicate glass.

A typical soda-lime-silica (or soda-lime-silicate) glass composition is (by weight), $SiO_2$ 69-74%; $Al_2O_3$ 0-3%; $Na_2O$ 10-16%; $K_2O$ 0-5%; $MgO$ 0-6%; $CaO$ 5-14%; $SO_3$ 0-2%; $Fe_2O_3$ 0.005-2%. The glass composition may also contain other additives, for example, refining aids, which would normally be present in an amount of up to 2%. The soda-lime-silica glass composition may contain other colouring agents such as $Co_3O_4$, NiO and Se to impart to the glass a desired colour when viewed in transmitted light. The transmitted glass colour may be measured in terms of a recognised standard such as BS EN410.

Preferably the sheet of glazing material comprises a sheet of thermally toughened glass and/or a sheet of annealed glass and/or a laminated glazing pane comprising first and second sheets of glazing material joined by an interlayer structure comprising at least one adhesive interlayer ply.

Preferably the sheet of glazing material is a laminated glazing pane comprising first and second sheets of glazing material, in particular glass such a soda-lime silica glass, joined by an interlayer structure comprising at least one adhesive interlayer ply, in particular polyvinyl butyral.

Preferably the glazing is a glazing for a vehicle. Preferably the glazing is a vehicle windscreen, a vehicle backlight, a vehicle side window or a vehicle roof window i.e. a vehicle sunroof.

Preferably the glazing is a vehicle backlight and the electrically actuated device is a signalling light, in particular a brake light, an indicator light or a reverse light.

Preferably the glazing is a vehicle roof window, wherein the electrically actuated device is a light configured to emit light into an interior portion of the vehicle.

Preferably the glazing is a glazing for a building.

Preferably the glazing is part of a door or partition.

Suitably the electrically actuated device comprises a circuit board wherein the first electrically actuated device and the first and second electrical connectors of the electrically actuated device are mounted on the circuit board. The circuit board mechanically supports the first electrically actuated component. Preferably the circuit board comprises a rigid material, suitably fibreglass or plastic. Preferably the circuit board is a printed circuit board. Preferably the printed circuit board is a double sided printed circuit board and the first electrically actuated component is on one side of the printed circuit board and the first and/or second electrical connector of the electrically actuated device is on the opposite side of the printed circuit board.

Preferably the electrically actuated device comprises switching means to actuate or switch the electrically actuated component between the energized state and the unenergized state.

Preferably the electrically actuated device comprises a housing configured to cover the electrically actuated device when the electrically actuated device is releasably fixed to the glazing.

Preferably the electrically actuated device comprises a display means such as a screen to display information thereon.

Preferably the electrically actuated device comprises processing means.

In some embodiments the first anchoring support has a housing and an electrical connector, the housing being configured to engage with a suitable housing comprising the first electrical connector of the electrically actuated device. Preferably the housing is made of plastic or metal. If the housing is made of metal, preferably the housing is earthed or electrically shielded.

When there is a second anchoring support mounted on the first major surface in electrical, preferably the first and second anchoring supports share a common housing, the common housing being configured to engage with a suitable housing comprising the first and second electrical connectors.

In some embodiments the glazing comprises at least one (a first) supplemental electrical connector configured either as an anchoring support or not as an anchoring support, the first supplemental electrical connection being configured to provide the electrically actuated device with an input signal to control the function thereof.

In another aspect the objectives of the present invention are achieved by a brake light to be mounted to a structural element such as, for example, the glass of the rear window of a motor vehicle and comprising a support plate, usually a printed circuit board, having the rear face thereof provided with two conductive elements and securing at least one LED, which is electrically connected to the two conductive elements and to be energized from the positive and negative poles, respectively, of the electric circuit of the vehicle.

Accordingly from a second aspect the present invention provides a vehicle light, in particular a brake light, to be mounted to a structural element such as, for example, the glass of the rear window of a motor vehicle and comprising a support plate, usually a printed circuit board, having the rear face thereof provided with two conductive elements and securing at least one LED, which is electrically connected to the two conductive elements and to be energized from the positive and negative poles, respectively, of the electric circuit of the vehicle.

The vehicle light further comprises: the at least one LED incorporating a respective lens having a light emitting angle lower than 45°; two connectors of an electrically conductive material, affixed to the rear face of the support plate, each of them being electrically connected to a respective conductive element of the support plate; and two anchoring supports to be previously affixed against the structural element of the motor vehicle, usually defined by the inner face of the glass of the rear window, each anchoring support being configured to receive the fitting, with mechanical retention and electrical connection, of a respective connector of the support plate and to be connected to the positive and negative poles of the electric circuit of the vehicle.

The vehicle light proposed by the present invention comprises, besides the usual components defined by the support plate and by one or more LEDs, only a pair of connectors incorporated to the support plate and a pair of anchoring supports to be previously affixed to the glass, or to another structural element of the vehicle, in order to each receive the fitting, with mechanical retention and electrical connection, of a respective connector of the support plate.

Thus, the vehicle light presents an extremely simple construction, of easy assembly and reduced dimensions, and which may be optionally and easily hidden by a small trim portion of the vehicle in the edge portion of the glass, without requiring the provision of the usual housing, of the lens for concentrating the light emissions from the LED or LEDs, and of the trim front cover for the housing.

Furthermore, the assembly defined by the support plate, the LED or LEDs, and also by the pair of connectors, may be easily disconnected from the anchoring supports whenever necessary for maintenance or replacement purposes of this assembly of simple construction.

Preferably each anchoring support comprises a base portion, to be seated and affixed against the component of the structure of the vehicle, and an engagement portion projecting from the base portion and being configured to be fitted into a respective connector of the support plate.

Preferably each of the connectors of the support plate takes the form of a female connector having a split tubular form and being elastically deformable, the engagement portion of each anchoring support having the form of a tab to be press-fitted in the interior of a respective connector of the support plate.

In some embodiments the component of the structure of the vehicle is defined by the glass of the rear window of said vehicle, characterised in that the axis of the light emission of the at least one LED is orthogonal to the plane of the support plate, the base portion of each anchoring support being seated and affixed against the inner face of the glass, the engagement portion forming, with the seating plane of the base portion in the glass, a first acute angle complementary to a second acute angle formed between the seating plane of the base portion and the travelling plane of the vehicle, upon fitting the connectors to the anchoring supports already affixed to the glass of the vehicle.

Preferably the engagement portion of each of the anchoring supports is configured and dimensioned to hold the lens of the at least one LED adjacent to the inner face of the glass of the rear window, upon fitting the connectors to the anchoring supports.

In some embodiments the support plate affixes, in the rear face thereof, a plurality of LEDs operatively associated with a single lens, in the form of a lens guide extended along the entire alignment of LEDs.

Preferably the vehicle light is a signalling light, in particular a brake light, an indicator light or a reverse light.

Preferably the vehicle light is a light for illuminating a portion of the interior of the vehicle.

For the avoidance of doubt according to the second aspect of the present invention there is provided a vehicle light, in particular a brake light, to be mounted to a component of the structure of a vehicle and comprising a support plate with its rear face provided with two electric conducts and having affixed thereto at least one LED electrically connected to the two electric conducts and to be powered, respectively, from the positive and negative poles of the electric circuit of the vehicle, characterised in that it comprises: the at least one LED incorporating a respective lens having a light emission angle lower than 45°; two connectors of an electrically conductive material, affixed to the rear face of the support plate, each being electrically connected to a respective electric conduct of the support plate; and two anchoring supports of an electrically conductive material, to be previously affixed against the component of the structure of the vehicle, each anchoring support being configured to receive the fitting, with mechanical retention and electrical connection, of a respective connector of the support plate and to be electrically connected to the positive and negative poles of the electric circuit of the vehicle.

According to a third aspect of the present invention there is provided a mounting arrangement of a vehicle light to the glass of a window of a vehicle, in particular the glass of the rear window of a vehicle, said vehicle light being a vehicle light according to the second aspect of the present invention and said arrangement being characterised in that the inner face of the glass incorporates two first terminal bases and two second terminal bases, in the form of films of electrically conductive material, each of the first terminal bases receiving and having affixed over itself, a respective anchoring support of the vehicle light, each of the second terminal bases being positioned and configured to be connected to a respective pole of the electric circuit of the vehicle, and each first terminal base being connected to a respective second terminal base, respectively, by a first and a second powering thread, in the form of films of electrically conductive material incorporated to the inner face of the glass.

In some embodiments the glass is provided with an opaque mask incorporated to its inner face, said arrangement being characterised in that the first and the second terminal bases are positioned in a region of the glass covered by the opaque mask, the opaque mask being provided with at least one transparent window aligned to a respective LED of the vehicle light.

Preferably the opaque mask is positioned in a marginal and peripheral manner against the inner face of the glass defining, in the latter, a transparent median region and being provided with at least one transparent window aligned with a respective LED of the vehicle light.

Preferably the inner face of the glass incorporates, in the transparent median region, an additional opaque mask, the first terminal bases being positioned in a region of the glass covered by the additional opaque mask, which is provided with at least one transparent window aligned with a respective LED of the vehicle light.

In other embodiments the inner face of the glass incorporates a thermal defogging device which comprises a pair of collecting plates, made of a film of electrically conductive material and joined together by a plurality of conductive threads made of a film of electrically conductive material and provided throughout the transparent median region of the glass, said arrangement being characterised in that one of the second terminal bases is affixed over one of the collecting plates whereas, over the other collecting plate, is affixed a third terminal base to be connected to the electric circuit for powering the thermal defogging device.

Preferably at least one conductive thread of the thermal defogging device is provided in one of the conditions of being secant and adjacent to at least one transparent window of the opaque mask.

In other embodiments the glass is the glass of the rear window, side window or roof window of a vehicle.

According to a fourth aspect of the present invention, the vehicle light of the second aspect of the present invention is applied to a mounting arrangement, according to which the glass of the rear window of the vehicle is provided with an opaque mask, usually marginal and peripheral and incorporated to the inner face of the glass, said inner face further incorporating, in the form of films of an electrically conductive material, a pair of terminal bases and electric conducts (wiring) connecting said terminal bases to the electric circuit of the vehicle, the anchoring supports being formed of electrically conductive material and each being seated and affixed against a respective terminal base, in order for each to receive the fitting of a respective connector of the support plate.

With this mounting arrangement, the vehicle light may be assembled in any region of the glass of the rear window and connected to the electric circuit of the vehicle by electric conducts incorporated in the inner face of the glass itself, avoiding the need for the hidden assembly of electrical harnesses which increase the associated costs.

The present invention will be described below, with reference to the enclosed drawings (not to scale), given by way of example of possible ways of carrying out the invention, in which:

FIG. 1 represents a schematic simplified plan view of the rear face of the support plate carrying, in a first embodiment, a plurality of LEDs, each incorporating a respective lens, the pair of conductive elements defined in a printed circuit and also the two connectors;

FIG. 2 represents a schematic longitudinal cross-sectional view of the support plate, taken according to the arrows II-II in FIG. 1;

FIG. 3 represents a schematic cross-sectional view of the support plate, taken according to the arrows in FIG. 1, without representing the anchoring support;

FIG. 1A is a view similar to that of FIG. 1, however illustrating a constructive variation in which is provided a single lens incorporated to the plurality of LEDs;

FIG. 2A represents a schematic longitudinal cross-sectional view of the support plate, taken according to the arrows IIA-IIA in FIG. 1A;

FIG. 3A represents a schematic cross-sectional view of the support plate, taken according to the arrows IIIA-IIIA in FIG. 2A, without representing the anchoring support;

Figure 4:
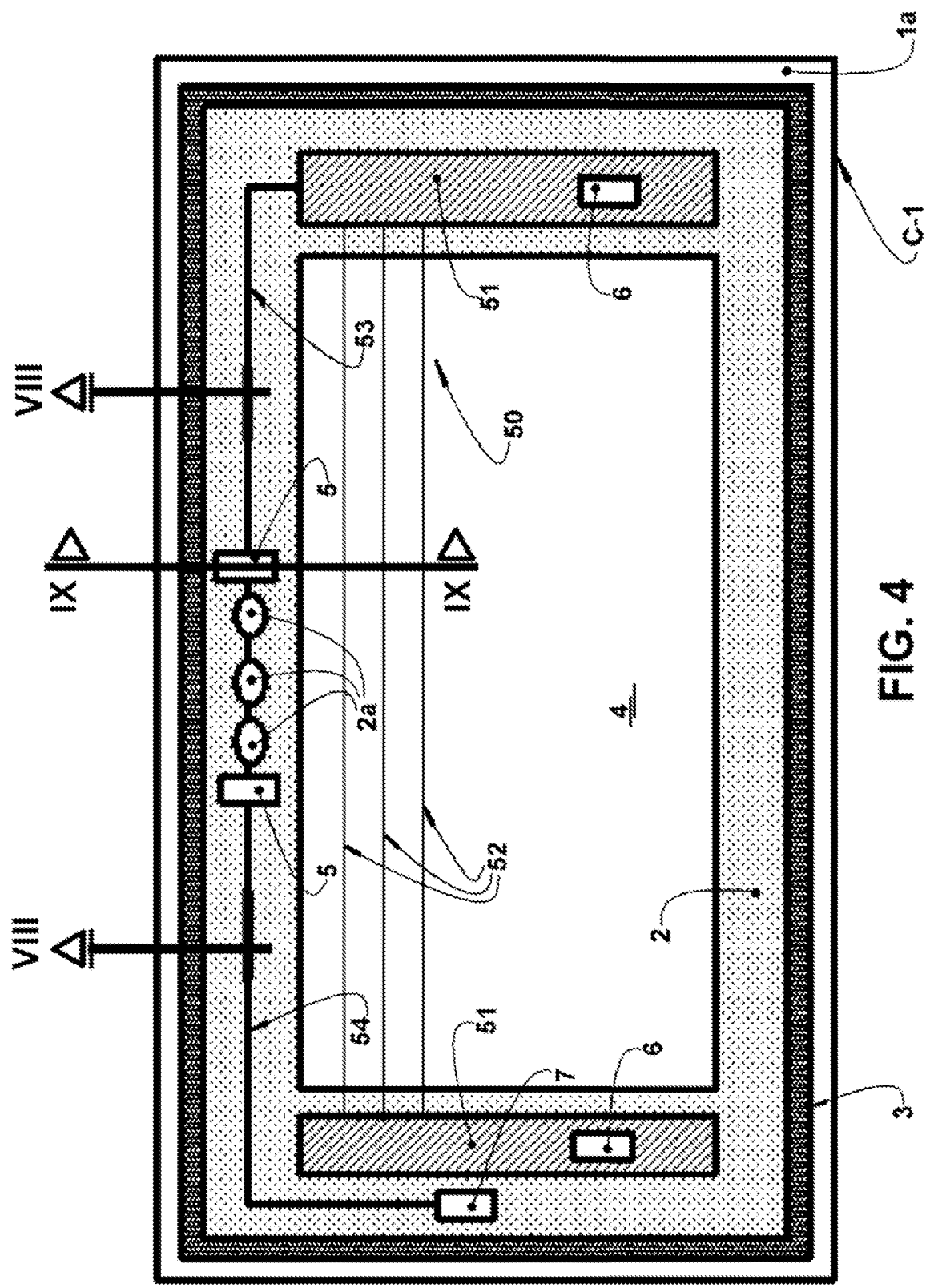
Figure 4A:
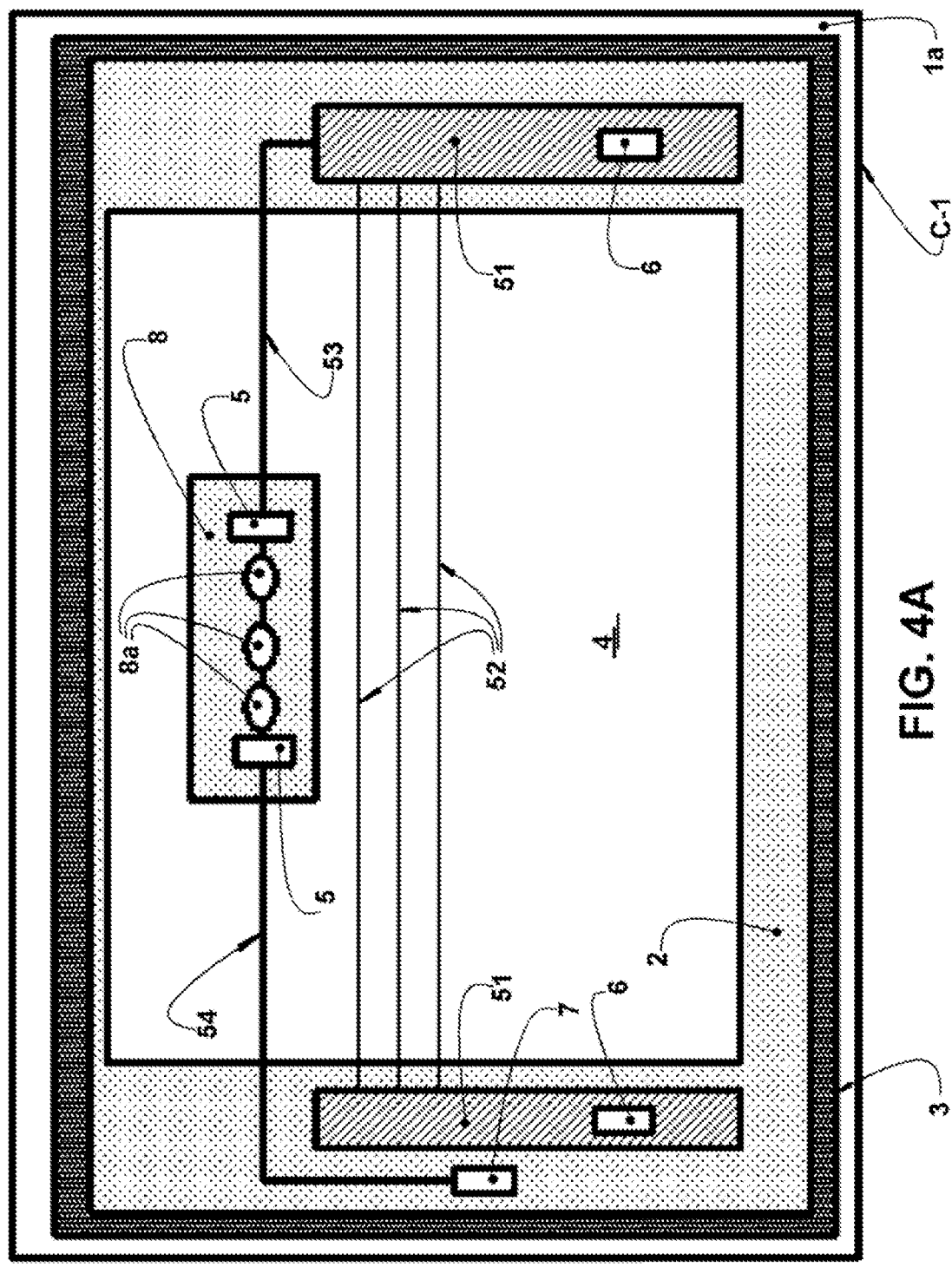
Figure 4B:
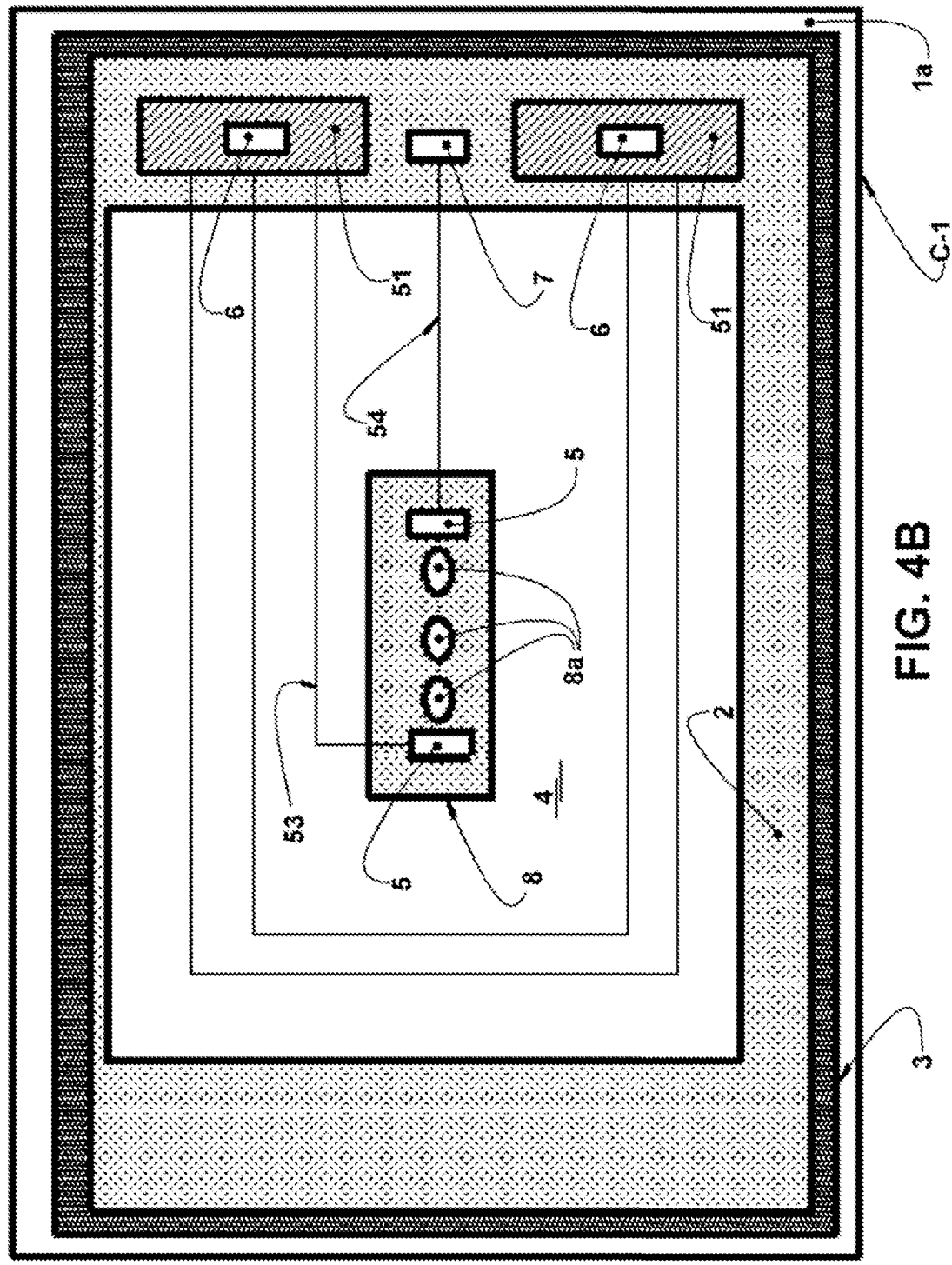
Figure 5:
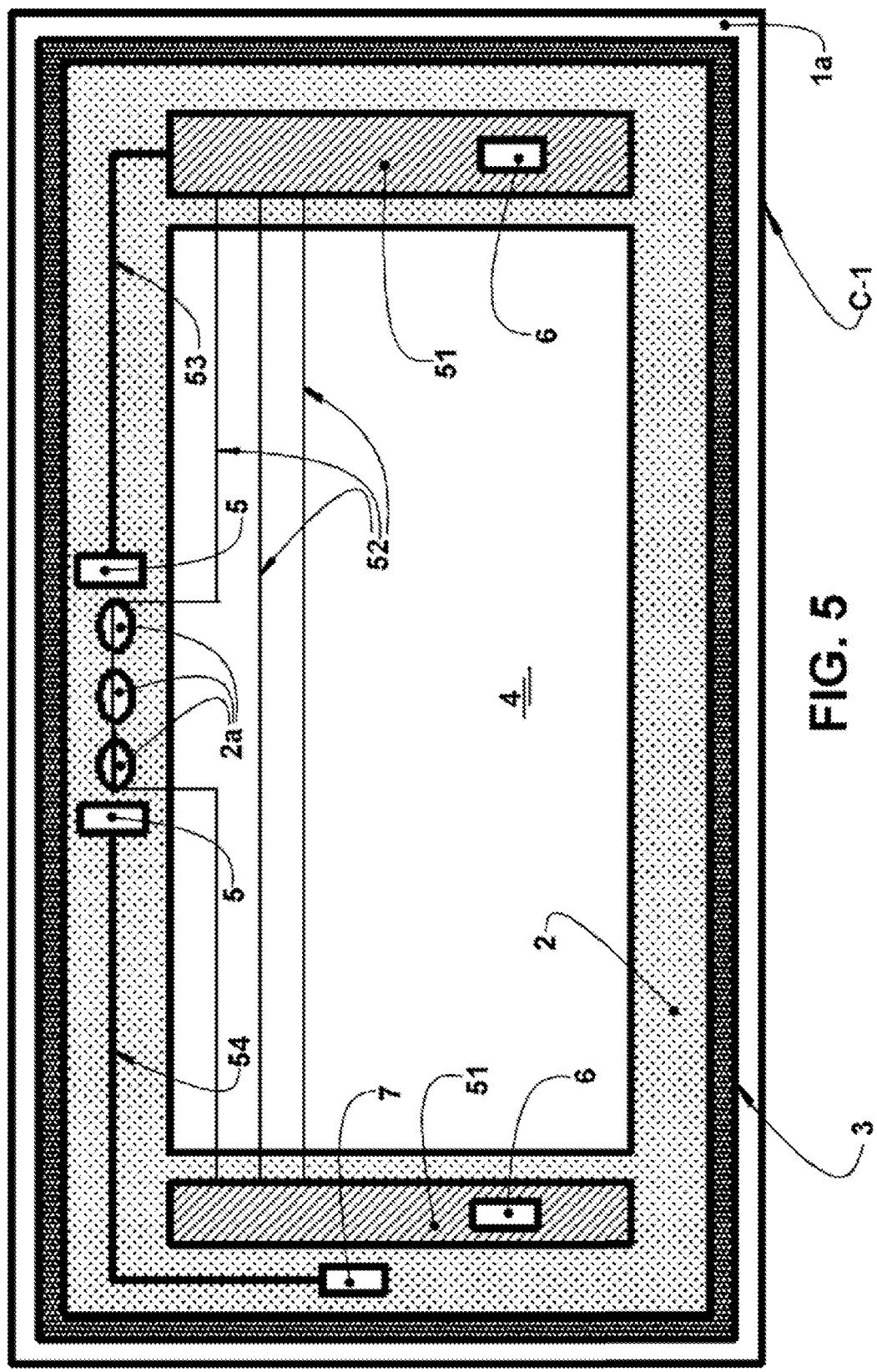
Figure 9:
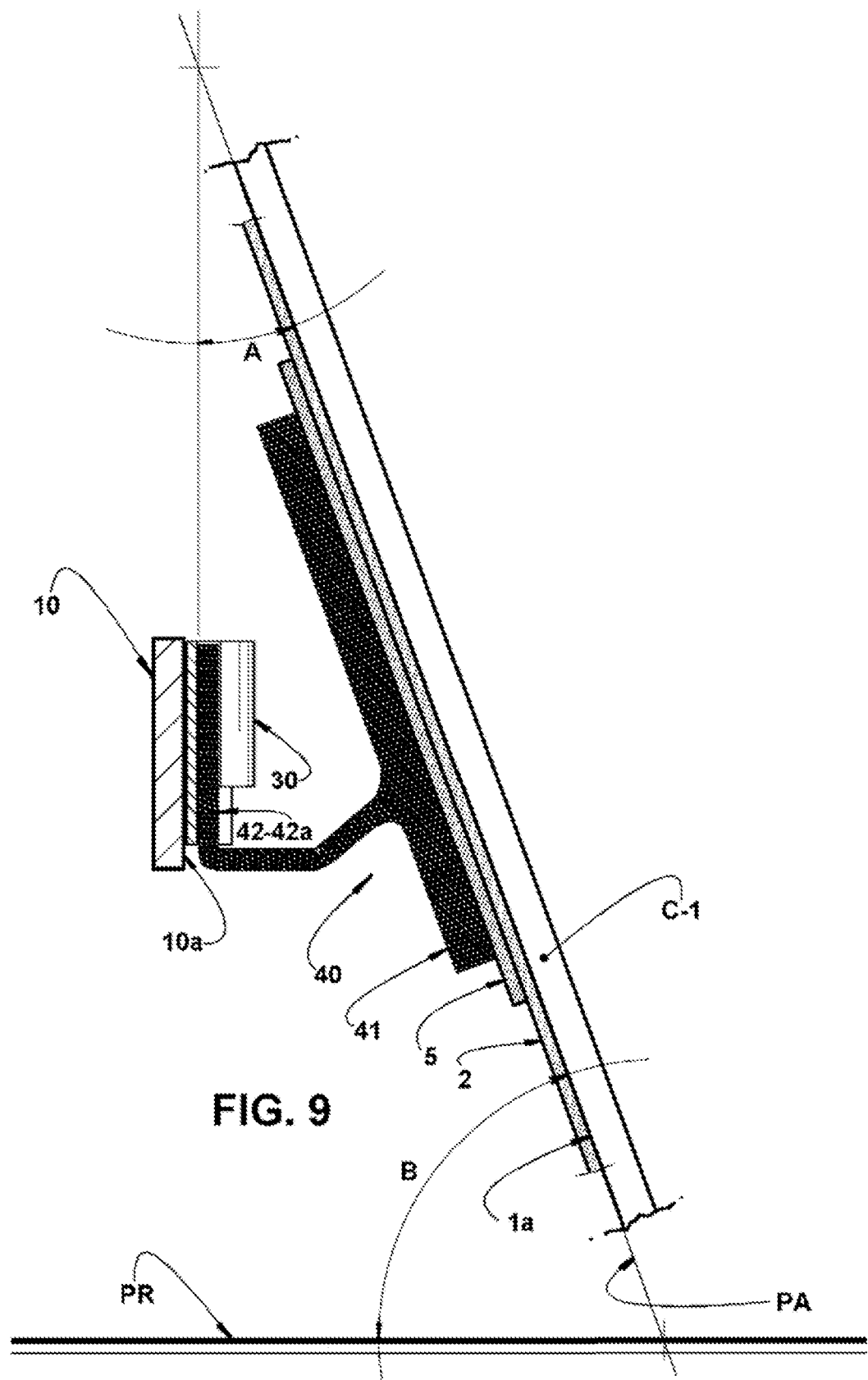
Figure 26:
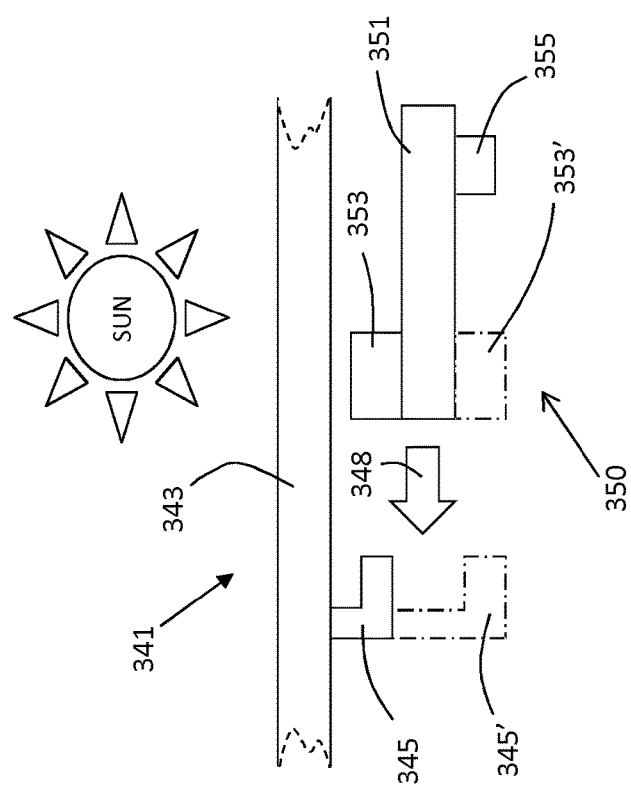
Figure 25:
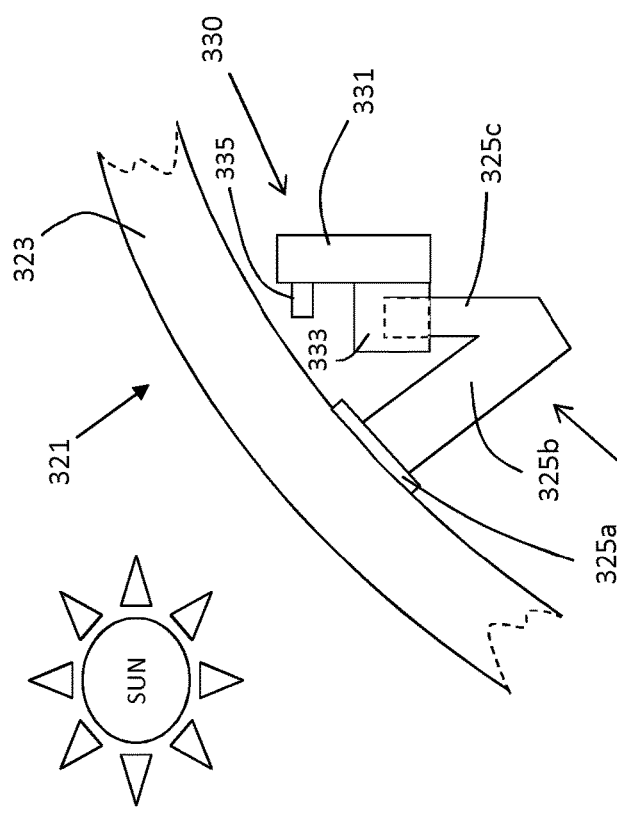
Figure 27:
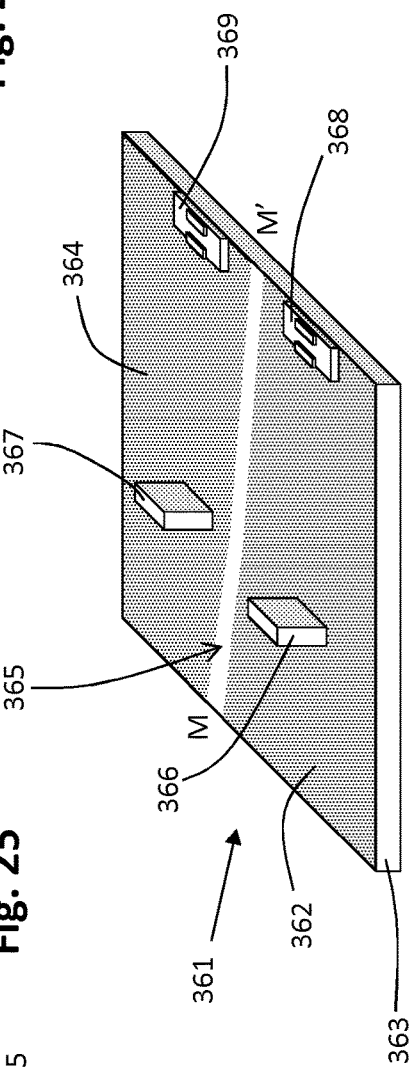

FIG. 4 represents a schematic plan view of the inner face of a glass of the rear window, incorporating a peripheral marginal opaque mask, usually in black silkscreen, the region for applying an adhesive bead, a thermal defogger in lines of silver silkscreen, the terminal bases and the electric conducts in lines of silver silkscreen, incorporated to the inner face of the glass in a region covered by the marginal opaque mask, the latter being provided with at least one transparent window aligned to a respective LED;

FIG. 4A represents a view similar to that of FIG. 4, however with the terminal bases of the brake light being incorporated to the glass of the rear window at a region thereof provided with a median opaque mask located at a transparent region of the glass, internal to the marginal opaque mask and not covered by the latter, but defined outside the area covered by the conductive lines of the thermal defogger;

FIG. 4B represents a view similar to that of FIG. 4A, however having the terminal bases of the brake light affixed to a region of the glass provided with a median opaque mask, internal to the marginal opaque mask and not covered by the latter and being defined within the area covered by the conductive lines of the thermal defogger;

FIG. 5 represents a view similar to that of FIG. 4, however having at least one conductive line of the thermal defogger crossing the area of the transparent windows of the opaque mask region and aligned to the LEDs of the brake light;

FIGS. 5A to 5H represent schematic plan views of an opaque mask portion, against which is mounted the brake light, in any of the conditions illustrated in FIGS. 4, 4A, 4B and 5, and illustrating other possible positioning of one or two conductive lines of the thermal defogger in relation to the transparent windows of said opaque mask portion;

FIGS. 6, 6A and 6B represent, respectively, perspective top and front views of the exemplary construction to be applied to each of the connectors incorporated to the rear face of the support plate;

FIG. 7 represents a perspective view of the exemplary construction applied to each of the anchoring supports to be mounted to the inner face of the glass;

FIG. 8 represents a partial, schematic and enlarged longitudinal sectional view of the glass of a rear window, taken according to arrows VIII-VIII in any of FIGS. 4, 4A and 4B and illustrating the support plate with its connectors being fitted into the respective anchoring support affixed to the glass;

FIG. 9 represents a partial, schematic and enlarged cross sectional view of the glass of a rear window, taken according to arrows IX-IX in any of the FIGS. 4, 4A and 4B and illustrating one of the two connectors of the support plate fitted into the respective anchoring support, when affixed to the glass with a suitable relative angular positioning between the support plate and the seating plane of the anchoring supports to the glass;

FIG. 10 shows a schematic isometric representation of an assembly having a glazing and an electrically actuated device;

FIG. 11 shows a plan view of the electrically actuated device shown in FIG. 10;

FIG. 12 shows a schematic isometric representation of the assembly of FIG. 10 where the electrically actuated device is releasably fixed to the glazing;

FIG. 13 shows a schematic isometric representation of another assembly having another glazing and another electrically actuated device;

FIG. 14 is a schematic front view of the assembly shown in FIG. 13;

FIG. 15 shows a schematic isometric representation of another assembly having another glazing and another electrically actuated device;

FIG. 16 shows a schematic isometric representation of the assembly of FIG. 15 where the electrically actuated device is releasably fixed to the glazing;

FIG. 17 shows a schematic isometric representation of another assembly having another glazing and another electrically actuated device;

FIG. 18 shows a partial cross sectional view of the glazing shown in FIG. 17;

FIG. 19 shows a schematic isometric representation of a glazing according to the present invention;

FIG. 20 shows a plan view of part of another glazing according to the present invention;

FIG. 21 shows a side view of the glazing shown in FIG. 20 with an electrically actuated device;

FIGS. 22-24 shown schematic side views of various configuration of electrically actuated device releasably fixed to a sheets of glazing material;

FIG. 25 shows a side view of a portion of a vehicle glazing having an electrically actuated device mounted thereon;

FIG. 26 shows a side view of a portion of a vehicle sunroof having an electrically actuated device mounted thereon; and FIG. 27 shows a schematic isometric representation of a glazing according to the present invention.

As illustrated in the drawing figures, an aspect of the invention relates to a brake light of the type, which is generally, but not exclusively, mounted to the inner face 1a of the glass 1 of the rear window of a motor vehicle and which comprises a support plate 10, for example in an elongated rectangular shape, having the rear face 10a provided with two electric conducts 11 (for example in the form of copper tracks) and having affixed thereto at least one LED 20 electrically connected to both electric conducts and to be powered, respectively, from the positive and negative poles of the electric circuit of the vehicle i.e. vehicle battery.

As already mentioned before, although the attached drawings illustrate the present brake light applied to the inner face of the glass of a rear window of a vehicle, it should be understood that the brake light of the invention may be applied to different components C of the vehicle structure, such as, for example, to the body parts and to spoilers, in which case it may be required to associate the brake light with a respective housing and/or with a small transparent panel to be positioned in front of the LEDs 20, in order to isolate and protect the brake light from agents external to the vehicle.

The support plate 10 is generally defined by a printed circuit board, which incorporates the pair of electric conducts 11 and in which rear face 10a is affixed at least one LED 20 which, in the alternative embodiment illustrated in FIGS. 1, 2 and 3, incorporates a respective lens 21 having a light emission angle lower than 45°. However, as illustrated in FIGS. 1A, 2A and 3A, when using a plurality of LEDs 20 affixed to the support plate 10, the individual lenses 21 of each LED 20 may be replaced by a single lens 22 extending throughout the entire alignment of the LED 20 units.

In the rear face 10a of the support plate 10 are affixed, preferably close to two opposite marginal regions and by any suitable means, two connectors 30 of electrically conductive material, each being electrically connected to one of the electric conducts 11 of the support plate 10. The two connectors 30 may be built in different manners and formats, such as the one illustrated in FIGS. 6 to 6B of the attached drawings.

In order for the support plate 10, which carries one or more LEDs 20 and the pair of connectors 30, to be mounted to the vehicle, the present brake light further comprises two anchoring supports 40 to be previously affixed against the inner face 1a of the glass 1 of the rear window, or against any other component C of the structure of the vehicle, each anchoring support 40 being configured to receive the fitting, with mechanical retention and electrical connection, of a respective connector 30 of the support plate 10, and to be electrically connected to the positive and negative poles of the electric circuit of the vehicle.

The assembly of the LED or LEDs 20 to the support plate 10 should be carried out in order to guarantee that the axis of the light emission of one or more LEDs 20 is preferably orthogonal to the plane of the support plate 10. This relative positioning makes easier to assemble the LEDs 20 to the support plate 10.

Although the anchoring supports 40 may be built in different forms, FIG. 7 illustrates a possible exemplary construction for both anchoring supports 40 which, in this case, each comprise a base portion 41 to be seated and affixed, by adhesion or fusion, against the inner face 1a of the glass 1 of the rear window of the vehicle, or against a portion of any component C of the structure of the vehicle, and an engagement portion 42 of an electrically conductive material which projects from the base portion 41 and forms, with the seating plane PA of the base portion 41 in the glass 1, or in another structural element of the vehicle, a first acute angle A which is complementary to a second acute angle B formed between the seating plane of the base portion 41 and the travelling plane PR of the vehicle, upon the fitting of the connectors 30 to the anchoring supports 40 already previously affixed to the glass 1, or in any other component C of the structure of the vehicle, as illustrated in FIG. 9.

The construction of the anchoring supports 40 should be carried out in such a manner that, upon fitting, to the latter, the respective connectors 30 of the support plate 10, the light beam emitted by the LED or LEDs 20 is projected, from the vehicle, in a trajectory visible to the driver of the following vehicle, that is, in a trajectory substantially parallel to the travelling plane PR.

Still as illustrated in FIGS. 8 and 9, the anchoring supports 40 have the engagement portion 42 thereof configured and dimensioned to hold the support plate 10, in a position in which the lens 21, or the lens 22 of the LED or LEDS 20, is/are in a suitable position in relation to the adjacent inner face 1a of the glass 1 of the rear window of the vehicle, or to any other component C structure of the vehicle, upon the fitting of the connectors 30 in the respective anchoring supports 40 already affixed to the vehicle, generally to the glass 1 of the rear window of said vehicle.

In the embodiment illustrated in the FIGS. 1-9, the anchoring support 40 is made of an electrically conductive material and has the base portion 41 thereof incorporated, generally in a single piece, to the engagement portion 42.

It should be understood that the connectors 30 may be built in different forms and that the FIGS. 6, 6A and 6B illustrate only one possible exemplary construction for both connectors 30 which, in this case, each take the form of a female connector having a split tubular form and being elastically deformable, with the engagement portion 42 of each anchoring support 40 having the form of a tab 42a to be press-fitted inside a respective connector 30 of the support plate 10.

The construction proposed herein and described above for the present brake light allows the latter to be applied to a new mounting arrangement to the glass of the rear window of a vehicle, with the inner face 1a of said glass 1 incorporating, generally but not mandatorily, an opaque mask 2, which is marginal and peripheral, usually in the black colour and hiding an adhesive bead 3 to be applied to the inner face 1a of the glass 1, in order to be affixed to the vehicle body in a manner well known to the art, as illustrated in FIGS. 4, 4A and 5.

The opaque mask 2 delimits, in the glass 1, a transparent median region 4 which is generally, but not mandatorily, provided with a thermal defogging device 50, as described further below.

Independently of the existence of the thermal defogging device 50, the mounting arrangement of the present brake light comprises the provision of two first and two second terminal bases 5, 6, in the form of films of electrically conductive material such as a metallic alloy, which are glued or by any other means affixed to the inner face 1a of the glass 1, each of the first terminal bases 5 receiving and affixing, on itself, a respective anchoring support 40 of the brake light, each of the second terminal bases 6 being positioned and configured to be connected to a respective pole of the electric circuit of the vehicle, and each first terminal base 5 being connected to a respective second terminal base 6, respectively, by a first and by a second powering thread 53,54, in the form of films of an electrically conductive material, which are incorporated to the inner face 1a of the glass 1.

The first terminal bases 5 are positioned to receive and carry thereon the anchoring supports 40 of the brake light, with the second terminal bases 6 being positioned and configured to allow them to be easily connected to the positive and negative poles of the electric circuit of the vehicle, by means of the usual electric conducts (not illustrated).

The second terminal bases 6 are affixed to the glass 1 in marginal regions thereof generally covered by the opaque mask 2, making easier their connection to the electric conducts of the circuit of the vehicle. The first terminal bases 5 may be affixed in a marginal region of the glass 1 covered by the opaque mask 2, or in a median region of the glass, as mentioned further below and illustrated in FIGS. 4A and 4B.

In the glasses 1, provided with the defogging device 50, the latter comprises a pair of collecting plates 51, each being formed by a film of electrically conductive material, generally a silver film, and incorporated to the inner face 1a of the glass 1, in one or two opposite lateral regions and covered by the opaque mask 2. One of the second terminal bases 6 is affixed over one of the collecting plates 51, whereas over the other collecting plate 51 is affixed a third terminal base 7 to be connected to the electric circuit for powering the thermal defogging device 50.

In the drawing figures, the glass 1 is provided with the defogging device 50, comprising two collecting plates 51, which are joined together by a plurality of conductive threads 52 provided over the transparent median region 4 of the glass 1. The conductive threads 52 are generally silk-screened in silver to the inner face 1a of the glass 1, together with the collecting plates 51. Onto one of the collecting plates 51 is affixed a respective second terminal base 6 to be connected to a pole of the electric circuit of the vehicle, as already mentioned. In this case, one of the collecting plates 51 may be connected to one of the first base terminals 5, which receives a respective anchoring support 40, by means of the first powering thread 53, which is also incorporated, by silk-screening and in an electrically conductive material, to the inner face 1a of the glass 1 and which is totally or partially covered by the respective portion of the opaque mask 2.

In order to complete the powering of the brake light, the first terminal base 5, not connected to the thermal defogging device 50, is kept connected to a second powering thread 54, which is also incorporated, by silk-screening, to the inner face 1a of the glass 1, which second powering thread 54 is totally or partially covered by the respective portion of the opaque mask 2, and which ends in the other second terminal base 6, to be connected to the brake switch of the vehicle by a suitable electrical conduct, not illustrated. This other second terminal base 6 is electrically isolated and spaced apart from the collecting plates 51 of the defogging device 50.

With the constructive arrangement described above, the silk-screening of the thermal defogging device 50 provides itself the first and the second powering threads 53, 54, which define the conductors for electric power supply of the brake light.

In FIGS. 4 and 5, the first terminal bases 5 are positioned in a region of the glass 1 covered by the opaque mask 2, marginal and peripheral, in order for the brake light to be positioned in front of said opaque mask 2, which is then provided with at least one transparent window 2a positioned so as to be aligned with a respective LED 20 or set of LEDs 20, upon the assembly of the brake light.

In the construction of FIG. 4, the transparent windows 2a are not associated with any conductive thread 52 of the thermal defogging device 50, whereas in FIG. 5 the transparent windows 2a are sectioned by a conductive thread 52. In FIGS. 4A and 4B, the pair of first terminal bases 5 is affixed in a median region of the glass 1 not covered by the opaque mask 2, that is, in the transparent median region 4. In this case, the two first terminal bases 5 are affixed in a region of the glass covered by an additional opaque mask 8, also provided with a transparent window 8a positioned so as to be aligned with a respective LED 20 or set of LEDs 20, upon the assembly of the brake light.

Although FIGS. 4A and 4B do not illustrate the provision of one or more conductive threads 52 operatively associated with the transparent windows 8a, it should be understood that one or more conductive threads 52 may be provided in a way secant or adjacent to said transparent windows 8a, according to any physical layout suitable to the defogging of said windows, such as the example given by FIGS. 5A to 5H.

As illustrated in FIGS. 8 and 9, the assembly of the connectors 30 of the support plate 10 in the anchoring supports 40, already previously affixed to the respective first terminal bases 5, is carried out by a simple fitting, the anchoring supports 40 being configured so that the light beam of the LEDs 20 have a trajectory able to be detected by the conductor of a following vehicle.

According to the invention, the engagement portion 42 of each of the anchoring supports 40 is configured and dimensioned to maintain the lens 21 of the at least one LED 20, or the lens 22 common to a plurality of LEDs 20, adjacent to the inner face 1a of the glass 1 of the rear window, upon fitting the connectors 30 to the anchoring supports 40, with the axis of the lens 21 or of the lens 22 being axially and coaxially aligned to a respective window 2a of the marginal opaque mask 2, or to a respective window 8a provided in the additional median opaque mask 8.

FIG. 10 shows a schematic isometric representation of an assembly comprising a glazing 61 in accordance with the first aspect of present invention and an electrically actuated device 80.

The glazing 61 comprises a sheet of glazing material 63, for example a sheet of soda-lime-silicate glass. The sheet of glazing material has a first major surface 62 and an opposing second major surface (not labelled).

There is a first region 70 of electrically conductive material on the first major surface 62. There is also a second region 73 of electrically conductive material on the first major surface 62. The first and second electrically conductive regions are in electrical communication by means of electrically conductive path 71.

The first electrically conductive region 70 is a layer comprising silver that has been screen printed on the first major surface 62 and is bonded thereto. The second electrically conductive region 73 is a layer comprising silver that has been screen printed on the first major surface 62 and is bonded thereto. The electrically conductive pathway 71 is a layer comprising silver that has been screen printed on the first major surface 62. It is preferred to screen print the first electrically conductive region 70, the second electrically conductive region 73 and the electrically conductive pathway 71 during the same screen printing operation.

Mounted on the sheet of glazing material 63 is a first anchoring support 65, a second anchoring support 67 and an electrical connector 69.

In this example the first and second anchoring supports 65, 67 are electrically conductive metal strips (i.e. steel) with a portion for mounting to the sheet of glazing material and a portion for connection to a suitable electrical connector. The anchoring supports 65, 67 may be 'L'-shaped, or configured as shown in FIG. 7.

The first anchoring support 65 is fixed to the second electrically conductive region 73 such that the first electrical connector 69 is in electrical communication with the second electrically conductive region. It is preferred that the first anchoring support 65 is fixed to the second electrically conductive region 73 by adhesion or fusion, for example by a suitable adhesive or solder.

In a similar way to the first anchoring support 65, the electrical connector 69 is fixed to the first electrically conductive region 70 by adhesion or fusion.

In view of the electrically conductive pathway 71, the first anchoring support 65 is in electrical communication with the electrical connector 69.

The second anchoring support is mounted directly on the first major surface 62 of the sheet of glazing material 63 and is fixed thereto by means of a suitable adhesive (not shown) or by fusion. The second anchoring support 67 is electrically isolated from the first anchoring support 65 and the electrical connector 69.

With further reference to FIG. 11, the electrically actuated device 80 comprises a substrate (or support plate) 81. Fixed to the substrate 80 is a first electrical connector 83, a connector 85 and a second electrical connector 87. The first connector 85 is electrically isolated from the first and second electrical connectors 83, 87.

The first and second electrical connectors 83, 87 are electrically conductive, but the connector 85 does not have to be.

Mounted on the substrate 81 are first, second and third light emitting diodes 91, 93 and 95. An electrical circuit 89 comprising electrical conductive pathways 89a, 89b, 89c, 89d and 89c i.e. copper tracks, electrically connect the light emitting diodes between the first electrical connector 83 and the second electrical connector 87. The substrate 80 with electrically conductive tracks thereon is suitably a printed circuit board.

The first electrical connector 83 is in electrical communication with the first light emitting diode 91 via the electrically conductive pathways 89a and 89b.

The first light emitting diode 91 is in electrical communication with the second light emitting diode 93 via the electrically conductive pathway 89c.

The second light emitting diode 93 is in electrical communication with the third light emitting diode 95 via the electrically conductive pathway 89d.

The third light emitting diode 95 is in electrical communication with the second electrical connector 87 via the electrically conductive pathway 89e.

In this example the light emitting diodes 91, 93, 95 are electrically connected in series but one or more of the light emitting diodes 91, 93, 95 may be electrically connected in parallel.

Upon electrically connecting the first electrical connector 83 to a first terminal (i.e. the positive terminal) of a suitable power supply, and electrically connecting the second electrical connector 87 to the second (i.e. the negative terminal) of the suitable power supply, the light emitting diodes 91, 93, 95 have electrical power supplied thereto and illuminate i.e. they switch on. The light emitting diodes are in an energized state. Upon disconnecting the power supply, the light emitting diodes switch off and are in an unenergized state.

To fix the electrically actuated device 80 to the glazing 61, the electrically actuated device 80 is moved in the direction of arrow 97 towards the sheet of glazing material 63 such that, with the first anchoring support 65 aligned with the first electrical connector 83 and the second anchoring support 67 aligned with the connector 85, continued movement in the direction of arrow 97 causes the first anchoring support 65 to engage with the first electrical connector 83 and the second anchoring support 67 to engage with the connector 85. This configuration of electrically actuated device 81 and glazing 61 is shown in FIG. 12. The engagement of anchoring support 65, 67 with respective connector 83, 85 may be a friction fit to mechanically retain the electrically actuated device 81 relative to the sheet of glazing material 63.

In accordance with the present invention, the electrically actuated device is releasable from the glazing 61 and may be removed by pulling the electrically actuated device in the direction counter to arrow 97, thereby causing the first anchoring 65 to disengage from the first electrical connector 83 and the second anchoring support 67 to disengage from the connector 85.

In the configuration shown in FIG. 12, upon electrically connecting the electrical connector 69 to the positive terminal of a suitable power supply, and electrically connecting the second electrical connector 87 of the electrically actuated device 80 to the negative terminal of the power supply, the light emitting diodes have electrical power supplied thereto and illuminate, that is, the light emitting diodes 91, 93, 95 are in an energised state.

Depending upon the dimensions of the first anchoring support 65 and the first electrical connector 83, there may not a second anchoring support 67 and corresponding connector 85 on the electrically actuated device 80. Furthermore, there may be more than one electrically isolated anchoring support mounted on the sheet of glazing material, each with a corresponding connector on the electrically actuated device 80.

FIG. 13 shows a schematic isometric representation of an assembly comprising a glazing 101 in accordance with the present invention and an electrically actuated device 120 for fixing thereto. FIG. 14 shows a side view of the assembly shown in FIG. 13 in the direction of arrow 128.

The glazing 101 comprises a flat sheet of glass 103 having a first major surface 102 (as shown) and an opposing major surface (not labelled).

A plug 105 is mounted on the sheet of glass 103. The plug comprises a plastic body 106, a first electrical connector pin 107 and a second electrical connector pin 108. The plastic body 106 is fixed to the first major surface of the sheet of glass 103 by adhesive strips 109, 111, for example of cured epoxy resin. Each electrical connector pin 107, 108 extends proud of the plastic body for connection to a socket as will hereinafter be described in more detail. A portion 107' of the first electrical connector pin 107 extends through the plastic body 106 and a portion 108' of the second electrical connector pin 108 extends through the plastic body 106. The other end of the first and second electrical connector pins 107, 108 are configured to be electrically connected to other external electrical conductors.

Also mounted on the sheet of glass 103 are first and second electrical connectors 117, 119.

A first electrically conductive pathway 113 i.e. a screen printed silver layer on the first major surface of the sheet of glass 103 electrically connects the first electrical connector 117 to the first electrical connector pin 107 at the end thereof adjacent to the sheet of glass.

A second electrically conductive pathway 115 i.e. a screen printed silver layer on the first major surface of the sheet of glass 103 electrically connects the second electrical connector 119 to the first electrical connector pin 108 at the end thereof adjacent to the sheet of glass.

The electrical connection of the first and/or second electrical connector pin 107, 108 to the respective electrically conductive pathway 113, 115 may be via an electrically conductive adhesive or the like.

The electrically actuated device 120 comprises a substrate 121. Mounted on the substrate and fixed thereto is a socket 123 configured to engage with the plastic body 106 of the plug 105. Inside the socket 123 are two hollow electrical connectors 131, 133 configured to electrically connect with the electrical connector pins 107, 108 respectively.

Also mounted on the substrate are first and second light emitting diodes 125, 127. The hollow electrical connector 131 is in electrical communication with the first light emitting diode 125 via electrically conductive copper tracks 129a, 129a' and 129b on the surface of the substrate 121 (the electrically conductive copper tracks 129a, 129a' and 129b being electrically connected). The light emitting diode 125 is in electrical communication with the second light emitting diode 127 via electrically conductive copper track 129c on the surface of the substrate 121. The hollow electrical connector 133 is in electrical communication with the second light emitting diode 127 via electrically conductive copper tracks 129d, 129e and 129e' on the surface of the substrate 121 (the electrically conductive copper tracks 129d, 129e and 129e' being electrically connected).

Upon connecting the first hollow electrical connector 131 to the positive terminal of a suitable power supply, and the second hollow electrical connector 133 to the negative terminal of the suitable power supply, electrical power is supplied to the first and second light emitting diodes 125, 127 such that they are in an energized state and emit light.

The electrically actuated device 120 is fixed to the glazing 101 by moving in the direction of arrow 135 such that the first electrical connector pin 107 enters the hollow electrical connector 131 and the second electrical connector pin 108 enters the hollow electrical connector 133, each forming an electrical connection therewith.

When the electrical connector pin 107 is in the hollow electrical connector 131 there is an electrical connection therebetween but insufficient mechanical connection to retain the electrical connector pin 107 in the hollow connector 131.

Likewise, when the electrical connector pin 108 is in the hollow electrical connector 133 there is an electrical connection therebetween but insufficient mechanical connection to retain the electrical connector pin 108 in the hollow connector 133. Consequently the engagement between the electrical connector pins 107, 103 and the respective hollow electrical connectors 131, 133 is not sufficient to retain the electrically actuated device on the glazing 101.

The mechanical retention is achieved by the plastic body 106 of the plug 105 being a snug fit with the socket 123. The electrically actuated device 120 may be removed from the glazing 101 by pulling the plug 105 out of the socket 123, or pulling the socket counter to arrow 135.

When the plug 105 is in the socket 123, the hollow electrical connector 131 is in electrical communication with the first electrical connector 117 and the hollow electrical connector 133 is in electrical communication with the second electrical connector 119 such that upon electrically connecting the first electrical connector 117 to the positive terminal of a suitable power supply, and electrically connecting the negative terminal of the suitable power supply to the second electrical connector 119, electrical power is supplied to the light emitting diodes 125, 127 and each is in an energized state. Removing the power supply switches the light emitting diodes off so that they are in an unenergized state.

FIG. 15 shows a schematic isometric representation of an assembly comprising a glazing 141 in accordance with the present invention and an electrically actuated device 160. FIG. 16 shows a schematic isometric representation of the electrically actuated device 160 fixed to the glazing 141.

The glazing 141 comprises a sheet of glazing material, in this case a sheet of toughened soda-lime-silicate glass 143. The sheet of glass 143 has a first major surface 142 and an opposing second major surface (not labelled). On the first major surface 142 is a first region 153 of electrically conductive material i.e. a silver screen print layer and a second region 155 of electrically conductive material. Also mounted on the sheet of glass 143 are first and second electrical connectors 149, 151. The first electrical connector 149 is in electrical communication with the first region 153 via an electrically conductive pathway 150 and the second electrical connector 151 is in electrical communication with the second region 155 via an electrically conductive pathway 152.

Fixed to the first region 153 is a first anchoring support 145 and fixed to the second region 155 is a second anchoring support 147. Each anchoring support 145, 147 is electrically conductive, for example being made out of stamped sheet steel, and may be 'L'-shaped.

The electrically actuated device 160 comprises a substrate 161 of the type used in printed circuit boards. Mounted on the substrate 161 are three light emitting diodes 167, 169, 171 and first and second electrical connectors 163, 165. Copper tracks form circuit 173 and electrically connect the light emitting diodes 167, 169, 171 in series between the first electrical connector 163 and the second electrical connector 165 such that upon connecting the first electrical connector 163 to the positive terminal of a suitable power supply, and the second electrical connector 165 to the negative terminal of the suitable power supply, power is supplied to the light emitting diodes 167, 169, 171 such they emit light i.e. the light emitting diodes 167, 169, 171 are in an energized state.

The electrically actuated device 160 is fixed to the glazing 141 by engaging the first electrical connector 163 with the first anchoring support 145 and engaging the second electrical connector 165 with the second anchoring support 147 i.e. by moving the electrically actuated device 160 towards the glazing 141 in the direction of arrow 175.

When the electrically actuated device 160 is releasably fixed to the glazing 141, the electrically actuated device is mechanical retained relative to the sheet of glass 143. Also, when in this configuration (as shown in FIG. 16), upon connecting the first electrical connector 149 of the glazing 141 to the positive terminal of a suitable power supply, and the second electrical connector 151 of the glazing 141 to the negative terminal of the suitable power supply, electrical power is supplied to the light emitting diodes 167, 169, 171.

FIG. 17 shows a schematic isometric representation of an assembly comprising a glazing 181 in accordance with the present invention and an electrically actuated device 200.

The glazing 181 comprises a sheet of soda-lime-silicate glass 183. A portion of the upper surface of the glass sheet 183 is covered with an optically opaque mask 182, sometimes referred to as an obscuration band. Such an obscuration band 182 is bonded to the glass surface by suitable firing and is not electrically conductive. A region 184 of the upper major surface is not covered with the opaque mask and the glass sheet 183 is optically transparent in this region.

On the opaque mask are first and second electrically conductive regions 193, 195, typically of a silver screen print. First and second electrical connectors 189, 191 are also fixed to the opaque mask 182.

The first electrical connector 189 is in electrical communication with the first electrically conductive region 193 by a silver screen print line 190 and the second electrical connector 191 is in electrical communication with the second electrically conductive region 195 by a silver screen print line 192.

Fixed to the first electrically conductive region 193 is a first anchoring support 185 and fixed to the second electrically conductive region 195 is a second anchoring support 187. Each anchoring support is electrically conductive such that the first anchoring support 185 is in electrical communication with the first electrical connector 189 and the second anchoring support 187 is in electrical communication with the second electrical connector 191.

A partial cross section through the line A-A' is shown in FIG. 18 to show how the second anchoring support 187 is on the electrically conductive region 195, and the electrically conductive region is on the opaque mask 182. As such when viewed through the thickness of the sheet of glass 183 in the direction of the arrow 186 the second electrically conductive region 195 and the second anchoring support 187 are not visible.

The electrically actuated device 200 is similar to the electrically actuated device 160 except that instead of three light emitting diodes connected between the first and second electrical connectors of the electrically actuated device (labelled as 203 and 205 respectively), there is a single electrically actuated component 207 mounted on the substrate 201. The electrically actuated component 207 is in electrical communication with the first electrical connector 203 via copper track 206 and in electrical communication with the second electrical connector 205 via copper track 208.

Upon connecting the first electrical connector 203 to the positive terminal of a suitable power supply, and the second electrical connector 205 to the negative terminal of the suitable power supply, the electrically actuated component 207 has power supplied thereto and is in an energized state.

The electrically actuated device 200 is fixed to the glazing 181 by engaging the first electrical connector 203 with the first anchoring support 185 and the second electrical connector 205 with the second anchoring support 187.

When the electrically actuated device is releasably fixed to the glazing 141, upon connection the first electrical connector 189 of the glazing 181 to the positive terminal of a suitable power supply, and the second electrical connector 191 of the glazing 181 to the negative terminal of the suitable power supply, the electrical device has power supplied thereto and the electrically actuated component is energized.

FIG. 19 shows a schematic isometric representation of a glazing 211 in accordance with the present invention.

The glazing 211 comprises a sheet of glazing material 213 (such as a sheet of glass) having a first major surface 212 and an opposing major surface (not labelled).

Mounted on the sheet of glazing material are a first anchoring support 215, a second anchoring support 217, and first, second and third electrical connectors 219, 221, 223 respectively.

There is a silver screen print line 225 on the major surface 212 electrically connecting the second anchoring support 217 to the third electrical connector 223.

Also on the first major surface is a heater array 240 of the type used in heated rear windows in vehicles. The heater array 240 comprises electrically conductive heater lines 231, 232, 233, 234 between busbars 228, 230. The busbars are sometime referred to as collecting plates. The heater lines are sometimes referred to as conductive threads.

The busbar 228 is in electrical communication with the second electrical connector 221 via a silver screen print line 227 on the first major surface 212. The busbar 230 is in electrical communication with the first electrical connector 219 via a silver screen print line 229 on the first major surface 212.

Upon connecting the first electrical connector 229 to the positive terminal of a suitable power supply (for example a vehicle twelve volt battery), and the second electrical connector 221 to the negative terminal of the suitable power supply, the heater array is able to get hot to defog or defrost the glazing 211 in the region of the heater lines 231, 232, 233, 234.

The busbar 230 is also in electrical communication with the first anchoring support 215 via a silver screen print line 237 on the first major surface 212 of the sheet of glass 213.

If either of the first electrical connector 219 or the second electrical connector 221 is brought into electrical communication with a positive terminal of a suitable power supply, then the first anchoring support 215 is also in electrical communication with the positive terminal of the suitable power supply. In this configuration, the negative terminal of the suitable power supply may be electrically connected to the third electrical connector 223 such that the first anchoring support 215 is in electrical communication with the positive terminal of the suitable power supply and the second anchoring support 217 is in electrical communication with the negative terminal of the suitable power supply. As such, an electrically actuated device such as shown in FIG. 15 may be energized upon engaging the anchoring supports 215, 217 with the first and second electrical connectors respectively on the electrically actuated device (labelled as 163 and 165 in FIG. 15).

FIG. 20 shows a plan view of a portion of a glazing 241 in accordance with the present invention.

FIG. 21 shows a schematic cross-sectional view through line B-B' of the glazing shown in FIG. 20.

With reference to FIGS. 20 and 21, the glazing 241 comprises a sheet of glass 243. An electrically conductive screen print region comprising portions 250a, 250b and 250c are on the surface of the glass sheet, the electrically conductive region 250a being in electrical communication with the electrically conductive region 250c via electrically conductive region 250b. An electrical connector 249 is on the electrically conductive region 250a.

An anchoring support 245 is mounted on the sheet of glass 243. The anchoring support comprises a plastic body 246 mounted directly to the glass surface by suitable adhesive means (not shown). The plastic body 246 is hollow and defines a cavity. Extending through the plastic body is an electrical connector in the form of a bent pin having a portion 247 substantially parallel to the glass surface, a portion 248 substantially orthogonal to the first portion 247, and a base portion 248' for mounting to the sheet of glass. The base is mounted to the electrically conductive region 250c such that the portion 247 is in electrical communication with the electrical connector 249.

An electrically actuated device 260 is shown in FIG. 21 which comprises a substrate 261 having mounted thereon a light 270 and a plug 262 on the same side of the substrate. The plug 262 comprises a plastic body 263 and an 'L'-shaped electrical connector 265 configured to engage with the portion 247. The electrical connector 265 is in electrical communication with the light 270 via a copper circuit 269 on the surface of the substrate. A portion 267 of the 'L'-shaped electrical connector extends from an end opposite the engagement portion to electrically connect the electrical connector 265 to copper circuit 269.

The light 270 comprises a light emitting diode 272 and a lens 274 to collimate the light output from the light emitting diode.

Upon inserting the plug 262 into the cavity of the plastic body 246 the electrically actuated device 260 is mechanically retained on the glazing 241 and the light emitting diode is in electrical communication with the first electrode 249. Since the plug 262 is a snug fit in the cavity, the electrically actuated device 260 is mechanically retained to the glazing 241 and releasable therefrom.

When fixed on the glazing, light emitted from light 270 is directed towards the sheet of glazing material 243, but by mounting the light 270 on the opposite surface of the substrate 261 (shown as light 270'), light emitted from the light 270' will be directed away from the sheet of glazing material 243.

FIG. 22 shows a schematic side elevation of a glazing 281 in accordance with the present invention. The glazing 281 comprises a sheet of glazing material 283 having a first anchoring support 285 mounted thereto. An electrically actuated device 290 is shown which comprises a substrate 291 having a first electrical connector 293 mounted thereon in electrical communication with a light emitting diode 295. The first electrical connector 293 is shown mounted on the same side of the substrate as the light emitting diode 295, but the first electrical connector 293 may be mounted on the opposite side of the substrate (shown in outline as electrical connector 293', which also requires suitable modification to the first anchoring support 285 to engage therewith).

The electrically actuated device 290 may be fixed to the glazing 281 by moving downwards in the direction of arrow 287 and engaging the first anchoring support 285 with the electrical connector 293. The electrically actuated device 290 is shown fixed to the glazing 281 in outline as 290'.

When the electrically actuated device 290 is releasably fixed to the glazing 281 by engaging the first anchoring support 285 with the first electrical connector 293, the light emitting diode is arranged to emit light towards the sheet of glazing material 283 i.e. for a transparent sheet of glazing material 283, light emitted from the light emitting diode 295 is able to be transmitted through the sheet of glazing material 283.

FIG. 23 shows a schematic side elevation of the glazing 281 and another electrically actuated device 300.

The electrically actuated device 300 comprises a substrate 301 having a first electrical connector 303 mounted thereon in electrical communication with a light emitting diode 305. The first electrical connector 303 is shown mounted on the opposite side of the substrate as the light emitting diode 305, but the first electrical connector 303 may be mounted on the opposite side of the substrate (shown in outline as electrical connector 303', which also requires suitable modification to the first anchoring support 285 to engage therewith).

The electrically actuated device 300 may be fixed to the glazing 281 by moving downwards in the direction of arrow 287 and engaging the first anchoring support 285 with the electrical connector 303. The electrically actuated device 300 is shown fixed to the glazing 281 in outline as 300'.

When the electrically actuated device 300 is releasably fixed to the glazing 281 by engaging the first anchoring support 285 with the first electrical connector 303 (this configuration shown in outline as 300'), the light emitting diode is arranged to emit light away from the sheet of glazing material 283.

FIG. 24 shows a schematic side elevation of the glazing 281 and another electrically actuated device 310.

The electrically actuated device 300 comprises a substrate 311 having a first electrical connector 313 mounted thereon in electrical communication with a light emitting diode 315 mounted on one side of the substrate and an audible buzzer 317 mounted on the opposite side of the substrate.

The first electrical connector 313 is shown mounted on the same side of the substrate as the light emitting diode 315, but the first electrical connector 313 may be mounted on the same side of the substrate as the buzzer 317 (shown in outline as electrical connector 313', which also requires suitable modification to the first anchoring support 285 to engage therewith).

The electrically actuated device 310 may be fixed to the glazing 281 by moving downwards in the direction of arrow 287 and engaging the first anchoring support 285 with the electrical connector 313. The electrically actuated device 310 is shown fixed to the glazing 281 in outline as 310'.

When the electrically actuated device 310 is releasably fixed to the glazing 281 by engaging the first anchoring support 285 with the first electrical connector 313 (this configuration shown in outline as 310'), the light emitting diode 315 is arranged to emit light towards the sheet of glazing material 283. The position of the light emitting diode 315 and audible buzzer 317 may be alternated.

FIG. 25 shows a schematic side view of a portion of a curved vehicle glazing 321 i.e. a vehicle rear window.

The vehicle glazing 321 comprises a curved sheet of glass 323 having a first major surface facing the exterior of the vehicle in which the glazing is installed and an opposing second major surface facing the interior of the vehicle in which the glazing is installed. As shown, the first major surface is convex and the second major surface is concave.

Mounted on the concave surface of the glass sheet 323 is an anchoring support 325. The anchoring support 325 comprises a base portion 325a to be fixed to the glass surface by a suitable adhesive or by fusion. Extending from the base portion 325a is a first member 325b. At the other end of the first member 325b is an angled portion 325c. The angled portion 325c is configured to connect with a suitable electrical connector on an electrically actuated device. The base 325a, first member 325b and angled portion 325c may be integrally formed i.e. the anchoring support 325 is a single component.

An electrically actuated device 330 is shown fixed to the vehicle glazing 321. The electrically actuated device 330 comprises a substrate 331 having a first electrical connector mounted thereon. The first electrical connector is in electrical communication with a first light emitting diode 335. When the electrically actuated device is as shown in FIG. 15, there will be two anchoring supports mounted on the curved sheet of glass 323 and two electrical connectors mounted on the substrate 331.

In accordance with the present invention, electrical power is supplied to the light emitting diode 335 on one side by an electrical connection between one terminal of the power supply and the anchoring support 325.

The angled portion 325c of the anchoring support 325 is configured such that when the electrically actuated device is releasably fixed to the vehicle glazing 321, light is able to be emitted in a substantially horizontal direction through the curved sheet of glass such that the light is visible to another vehicle user. For example, the electrically actuated device may be used for vehicle signalling, such a braking, indicating or reversing.

FIG. 26 shows a schematic side view of a portion of a vehicle sunroof 341.

The vehicle sunroof 341 comprises a sheet of glass 343 (shown as flat but may be curved, having a convex surface and an opposing concave surface). Mounted on the sheet of glass 343 is an anchoring support 345. An electrically actuated device 350 is shown which comprises a substrate 351 having mounted on one side an electrical connector 353 and on the other side a light emitting diode 355. The electrical connector 353 is in electrical communication with the light emitting diode 355.

The electrical connector 353 may be mounted on the same side of the substrate as the light emitting diode 355 and is shown in this position in outline as 353'. Suitable modification is required to the anchoring support 345 (shown in outline as 345') when the electrical connector is in the configuration labelled as 353'.

The electrically actuated device 350 is fixed to the sunroof 341 by moving in the direction of arrow 348 with the angled portion of the anchoring support in alignment with the electrical connector 353. The electrical connector 353 is then able to engage with the anchoring support 345 to mechanically retain the electrically actuated device in position on the sunroof.

In accordance with the present invention, electrical power is supplied to the light emitting diode 355 on one side by an electrical connection between one terminal of the power supply and the anchoring support 345.

FIG. 27 shows a schematic isometric representation of another glazing 361 in accordance with the present direction.

The glazing 361 comprises a sheet of glass 363 having a first major surface and a second opposing major surface. The major surface visible in the figure is the first major surface.

The first major surface of the sheet of glass 363 has a first electrically conductive coating on a first portion 362 thereof and a second electrically conductive coating on a second portion 364 thereof. The first and second electrically conductive coatings may be the same or different.

The first portion 362 is electrically isolated from the second portion 364 by a line 365 that is void of electrically conductive material (extending between M and M'). For example, when the first and second electrically conductive coatings are the same, the line 365 may be produced by masking that portion of the first major surface of the sheet of glass. Alternatively, the line 365 may be created by removal of the coating, for example by laser ablation or mechanical means.

Mounted on the first electrically conductive coating in the first portion 362 of the first major surface is a first anchoring support 366 and a first electrical connector 368.

Mounted on the second electrically conductive coating in the second portion 364 of the first major surface is a second anchoring support 367 and a second electrical connector 369.

The anchoring supports 366, 367 and electrical connectors 368, 369 are electrically conductive and mounted on the glass sheet 363 (via the respective electrically conductive coating) by means of a suitable adhesive or solder.

The first anchoring support 366 is in electrical communication with the first electrical connector 368 and the second anchoring support 367 is in electrical communication with the second electrical connector 369. Due to the line 365 that is void of electrically conducting material, the first electrical connector 368 is electrically isolated from the second electrical connector 369.

An electrically actuated device as shown in FIG. 15 may be releasably fixed to the glazing 361 by engaging the first and second anchoring supports 366, 367 with the respective first and second electrical connectors on the electrically actuated device (labelled as 163 and 165 in FIG. 15). The electrically actuated device may then be powered i.e. placed in the energised state, by electrically connecting the first electrical connector 368 to one terminal of a suitable power supply and the second electrical connector 369 to the second terminal of the suitable power supply.

In the previous examples it will be readily apparent that by changing the configuration of the or each anchoring support it is possible to change the angle between the substrate of the electrically actuated device and the sheet of glazing material when the electrically actuated device is fixed thereto.

Although the examples describe electrically actuated devices where the electrically actuated component is a light emitting diode, other electrically actuated components may be used, such as sensors.

In any of the examples shown or described in relation to FIGS. 10 to 27, the electrically actuated device may be provided with a cover to protect the electrically actuated device when releasably fixed to the glazing. The cover may be releasably fixed to the electrically actuated device, for example by using mechanical fastener means, including fabric hook and loop fasteners attached to the substrate and inner surface of the cover respectively.

The invention claimed is:

1. A glazing comprising a sheet of glazing material having a first major surface and a second opposing major surface, there being a first anchoring support mounted on the sheet of glazing material, the first anchoring support being configured to engage with an electrical connector that is part of an electrically actuated device,
   the electrically actuated device comprising:
   a circuit board; and
   a first electrical connector, a second electrical connector, and at least one (a first) electrically actuated component in electrical communication with the first electrical connector and the second electrical connector, the entire first electrical connector being directly affixed on a first face of the circuit board and not supported by a second face of the circuit board opposite the first face,
   the first and second electrical connectors being connectable with an electrical power supply having first and second terminals such that upon electrically connecting the first electrical connector to the first terminal of the power supply and the second electrical connector to the second terminal of the power supply, the electrical device has electrical power supplied thereto and the electrically actuated component is in an energized state, the electrically actuated component having an unenergized state when no electrical power is supplied thereto;
   wherein when the first electrical connector is directly engaged with the first anchoring support,
   the electrical device is releasably fixed to the sheet of glazing material such that upon bringing the first terminal of the power supply into electrical communication with the first electrical connector via the first anchoring support, and bringing the second terminal of the power supply into electrical communication with the second electrical connector, the first electrically actuated component switches from the unenergized state to the energized state; and
   wherein the first anchoring support is disengageable from the first electrical connector by pulling the first electrical connector away from the first anchoring support.

2. A glazing according to claim 1, wherein the first anchoring support comprises first and second electrical conductors, the first electrical conductor of the first anchoring support configured to be connectable with the first terminal of the power supply and the second electrical conductor of the first anchoring support configured to be connectable with the second terminal of the power supply, the electrically actuated component being in the energized state when the first terminal of the power supply is in electrical communication with the first electrical conductor of the first anchoring support and the second terminal of the power supply is in electrical communication with the second electrical conductor of the first anchoring support.

3. A glazing according to claim 1, wherein the first anchoring support comprises a plug configured to engage with a socket, the socket being associated with the first electrical connector or wherein the first anchoring support comprises a socket configured to engage with a plug, the plug being associated with the first electrical connector.

4. A glazing according to claim 1, further comprising a second anchoring support mounted on the sheet of glazing material, the second anchoring support being configured to engage with the second electrical connector of the electrically actuated device, such that upon engaging the first electrical connector with the first anchoring support, and engaging the second electrical connector with the second anchoring support, the electrically actuated device is releasably fixed to the sheet of glazing material.

5. A glazing according to claim 4, wherein when the first electrical connector is engaged with the with first anchoring support, and the second electrical connector is engaged with the second anchoring support, upon bringing the first terminal of the power supply into electrical communication with first electrical connector via the first anchoring support and bringing the second terminal of the power supply into electrical communication with second electrical connector via the second anchoring support, the electrically actuated component is switched from the unenergized state to the energized state.

6. A glazing according to claim 1, wherein the first anchoring support is mounted on the first major surface.

7. A glazing according to claim 6, wherein the first anchoring support is mounted on the first major surface by an adhesive, in particular an electrically conductive adhesive, or a layer of solder.

8. A glazing according to claim 1, wherein at least one (a first) electrical conductor is on the first major surface, and the first electrical conductor on the first major surface is in electrical communication with the first anchoring support.

9. A glazing according to claim 1, wherein the electrically actuated component comprises a source of illumination.

10. A glazing according to claim 9, wherein the source of illumination is configured to emit light between the first major surface and the second major surface, or wherein the source of illumination is configured to emit light away from the first major surface.

11. A vehicle light, in particular a brake light, to be mounted to a component of the structure of a vehicle and comprising a circuit board with its rear face provided with two electric conducts and having directly affixed thereto at least one LED electrically connected to the two electric conducts and to be powered, respectively, from the positive and negative poles of the electric circuit of the vehicle, characterised in that it comprises: the at least one LED incorporating a respective lens having a light emission angle lower than 45°; two connectors of an electrically conductive material, the entire two connectors directly affixed to the rear face of the circuit board and not supported by the front face of the circuit board, each of the two connectors being electrically connected to a respective electric conduct of the circuit board; and two anchoring supports of an electrically conductive material, to be previously affixed against the component of the structure of the vehicle, each anchoring support being electrically connected to the positive and negative poles of the electric circuit of the vehicle and being configured to directly receive the fitting, with mechanical retention and electrical connection, of a respective connector of the circuit board for engagement therewith, and wherein the respective connector is disengageable from the respective anchoring support by pulling the electrical connector away from the respective anchoring support.

12. The vehicle light, as set forth in claim 11, wherein each anchoring support comprises a base portion, to be seated and affixed against the component of the structure of the vehicle, and an engagement portion projecting from the base portion and being configured to be fitted into a respective connector of the circuit board.

13. The vehicle light, as set forth in claim 12, wherein each of the connectors of the circuit board takes the form of a female connector having a split tubular form and being elastically deformable, the engagement portion of each anchoring support having the form of a tab to be press-fitted in the interior of a respective connector of the circuit board.

14. The vehicle light, as set forth in claim 12 and in which the component of the structure of the vehicle is defined by the glass of the rear window of said vehicle, wherein the axis of the light emission of the at least one LED is orthogonal to the plane of the circuit board, the base portion of each anchoring support being seated and affixed against the inner face of the glass, the engagement portion forming, with the seating plane of the base portion in the glass, a first acute angle complementary to a second acute angle formed between the seating plane of the base portion and the travelling plane of the vehicle, upon fitting the connectors to the anchoring supports already affixed to the glass of the vehicle.

15. The vehicle light, as set forth in claim 14, wherein the engagement portion of each of the anchoring supports is configured and dimensioned to hold the lens of the at least one LED adjacent to the inner face of the glass of the rear window, upon fitting the connectors to the anchoring supports.

16. The vehicle light, as set forth in claim 11, wherein the circuit board affixes, in the rear face thereof, a plurality of LEDs operatively associated with a single lens, in the form of a lens guide extended along the entire alignment of LEDs.

17. The vehicle light according to claim 11, wherein the vehicle light is a signalling light, in particular a brake light, an indicator light or a reverse light, or wherein the vehicle light is a light for illuminating a portion of the interior of the vehicle.

18. A mounting arrangement of a vehicle light to the glass of a window of a vehicle, in particular the glass of the rear window of a vehicle, said vehicle light being defined according to claim 11 and wherein the inner face of the glass incorporates two first terminal bases and two second terminal bases, in the form of films of electrically conductive material, each of the first terminal bases receiving and having affixed over itself, a respective anchoring support of the vehicle light, each of the second terminal bases being positioned and configured to be connected to a respective pole of the electric circuit of the vehicle, and each first terminal base being connected to a respective second terminal base, respectively, by a first and a second powering thread, in the form of films of electrically conductive material incorporated to the inner face of the glass.

19. The arrangement, as set forth in claim 18, with the inner face of the glass incorporating a thermal defogging device which comprises a pair of collecting plates, made of a film of electrically conductive material and joined together by a plurality of conductive threads made of a film of electrically conductive material and provided throughout the transparent median region of the glass, wherein one of the second terminal bases is affixed over one of the collecting plates whereas, over the other collecting plate, is affixed a third terminal base to be connected to the electric circuit for powering the thermal defogging device.

20. A mounting arrangement of a vehicle light to the glass of a window of a vehicle, in particular the glass of a rear window of a vehicle, said vehicle light being defined according to claim 11 and wherein the glass is provided with an opaque mask incorporated to the inner face of the glass, said inner face further incorporating, in the form of films of an electrically conductive material, a pair of terminal bases and electric conducts (wiring) connecting said terminal bases to the electric circuit of the vehicle, the anchoring supports being formed of electrically conductive material and each being seated and affixed against a respective terminal base, in order for each to receive the fitting of a respective connector of the circuit board.

* * * * *